(12) United States Patent
Vankayala et al.

(10) Patent No.: US 12,414,023 B2
(45) Date of Patent: Sep. 9, 2025

(54) METHOD AND NETWORK APPARATUS FOR PROVISIONING MOBILITY MANAGEMENT DURING CONGESTION IN A WIRELESS NETWORK

(71) Applicant: SAMSUNG ELECTRONICS CO., LTD., Suwon-si (KR)

(72) Inventors: Satya Kumar Vankayala, Andhra Pradesh (IN); Ashvin Kaithara Joseph, Karnataka (IN); Seungil Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 359 days.

(21) Appl. No.: 17/874,081

(22) Filed: Jul. 26, 2022

(65) Prior Publication Data

US 2024/0022986 A1  Jan. 18, 2024

(51) Int. Cl.
*H04W 36/22* (2009.01)
*H04W 28/02* (2009.01)
*H04W 28/08* (2023.01)

(52) U.S. Cl.
CPC ....... *H04W 36/22* (2013.01); *H04W 28/0268* (2013.01); *H04W 28/0942* (2020.05)

(58) Field of Classification Search
CPC ............. H04W 36/22; H04W 28/0268; H04W 28/0942; H04L 47/127
See application file for complete search history.

(56) References Cited

U.S. PATENT DOCUMENTS

| 7,551,800 B2 | 6/2009 | Corcoran et al. |
| 8,483,059 B2 | 7/2013 | Likar et al. |
| 9,596,620 B2 | 3/2017 | Lu et al. |
| 10,952,083 B2 | 3/2021 | Novlan et al. |
| 2021/0241090 A1 | 8/2021 | Chen et al. |
| 2022/0217595 A1* | 7/2022 | Kwok ............... H04W 36/22 |
| 2022/0271851 A1* | 8/2022 | Prasad ............... H04B 7/0652 |
| 2022/0295343 A1* | 9/2022 | Pefkianakis ........ H04W 36/304 |

FOREIGN PATENT DOCUMENTS

| JP | 2013-524573 A | 6/2013 |
| WO | WO 2011/119996 A1 | 9/2011 |
| WO | WO 2014/029090 A1 | 2/2014 |

OTHER PUBLICATIONS

India Examination Report dated Mar. 14, 2023 for IN Application No. 202141033707.

* cited by examiner

*Primary Examiner* — Mohammad S Adhami
*Assistant Examiner* — Andrew Chanul Kim
(74) *Attorney, Agent, or Firm* — NIXON & VANDERHYE P.C.

(57) ABSTRACT

Embodiments of the disclosure provide a method for provisioning mobility management during congestion in a wireless network by a network apparatus. The method includes: detecting a plurality of parameters of a current cell associated with at least one User Equipment (UE) in the wireless network; predicting an uplink (UL) congestion condition with an uplink radio resource of the current cell by applying at least one machine learning model to the plurality of parameters of the current cell; performing a mobility of the at least one UE from the current cell to at least one target cell in the wireless network based on the predicted UL congestion condition with the uplink radio resource of the current cell associated with the at least one UE.

12 Claims, 14 Drawing Sheets

METHOD AND NETWORK APPARATUS FOR PROVISIONING MOBILITY MANAGEMENT DURING CONGESTION IN A WIRELESS NETWORK

CROSS-REFERENCE TO RELATED APPLICATIONS

This application is based on and claims priority under 35 U.S.C. § 119 to Indian Provisional Patent Application No. 202141033707, filed on Jul. 27, 2021, in the Indian Patent Office, and to Indian Complete Patent Application No. 202141033707, filed on Jul. 14, 2022, in the Indian Patent Office, the disclosures of which are incorporated by reference herein in their entireties.

BACKGROUND

Field

The disclosure relates to a wireless network, and for example, to a method and a network apparatus for provisioning mobility management during congestion in the wireless network.

Description of Related Art

The important goals of a fifth generation (5G) network being URLLC (Ultra reliable with low latency), enhanced Mobile broadband and the Massive Connectivity. Also, a 5G medium is prone to losses, hence it is critical to handle error scenarios which causes latency, accessibility degradation and affects Quality of Experience (QoE).

In many scenarios an Uplink (UL) resources may be congested in a cell, so if a user of an electronic device or a User Equipment (UE) sends a scheduling request (SR) to a gNB for a UL grant, sometime the gNB may not be in position to provide the uplink resource. The user of the UE might attempt multiple times, and finally it may release its Physical Uplink Control Channel (PUCCH) resource and initiate random-access channel (RACH) procedure for PUCCH reallocation.

If the network allocated PUCCH resource successfully to the UE, then the UE may repeat the process (above mentioned). If the situation of the cell is not improved, then the cycle may repeat and user might not get resources to schedule its uplink data. This may show visible performance degradation to the user.

FIG. 1 and FIG. 2 illustrate existing congestion systems, according to the prior arts.

As shown in steps (S100) of FIG. 1, at S102, the method includes determining whether any data is to transmit. If any data is to transmit then, at S104, the method includes determining whether no other SR is in progress. If any data is not to transmit then, the method performs the step S102 again. If no other SR is in progress then, at S106, the method includes determining the SR_counter=0. At S108, the method includes determining whether the PUCCH is for SR configured? If the PUCCH is not for SR configured then, at S110, the method includes initiating the RACH process. If the PUCCH is for SR configured then, at S112, the method includes determining whether the measurement GAP and Sr-prohibit timer is not running? Based on the determination, at S114, the method includes determining SR_counter<dsr-TransMax. If the SR_counter is less than dsr-TransMax then at S116, the method includes performing at least one of notifying the RRC to release PUCCH/SRS, clearing any configured DL assignment and UL grants, cancelling all pending SRs and initiating RACH process. If the SR_counter is greater than dsr-TransMax then at S118, the method includes performing at least one of SR_counter=SR_counter+1, instructing PHY to send SR and starting sr-Prohibittimer.

As shown in FIG. 2, at S202, the UE (100) sends the SR (PUCCH) to the network apparatus (200). At S204, the network apparatus (200) sends the UL grant (DCI 0) to the UE (100). At S206, the UE (100) sends the user data (PUSCH) to the network apparatus (200). At S208, the network apparatus (200) sends the ACK/NACK on PHICH to the UE (100). At S210, the UE (100) determines whether the NACK is received. If the NACK is received then, at S212, the UE (100) performs the retransmission with the network apparatus (200).

In other words, referring to FIG. 2, it is possible that the network apparatus (200) may unable to schedule uplink grant to users due to uplink resource congestion. The UE (100) may need to wait until the network apparatus (200) provides the uplink grant in-order to send the uplink traffic. The UE (100) may not perform cell reselection because the anchored cell might be the best cell for the UE (100). The UE (100) nigh have tried to re-allocate the UL Resources and may perform RRC Re-establishment to overcome this situation. But if the cell condition persists then user might face the same issue of unavailability of UL Grant even after the recovery mechanism completed.

FIG. 3 illustrating a scenario of the UE (100) sends a MAC scheduling request, according to the prior arts. Referring to FIG. 3 consider a conventional methods and systems, includes the following steps:

1. The UE (100) sends a MAC scheduling request for requesting UL Grant for UL Data Transmission.
2. The gNodeB on congestion sate may not be able to provide UL Grant to the UE (100) and the UE (100) is unaware about this situation.
3. After sending the scheduling request maximum number of times, the UE (100) may release UL PUCCH resources.
4. The UE (100) may start sending MSG1 (RACH) for UL PUCCH Reallocation and the gNodeB may perform on the below steps.
5. If it ignore the message.
6. The gNB may ignore the RACH Message from the UE (100).
7. After maximum retransmission, the UE (100) will move to idle and perform the RRC Re-establishment procedure.
8. The whole process takes~12 Sec (worst case) to get reconnected to same cell.
9. If the re-establishment process is successful, the UE (100) may repeat the process from step 1. If the situation of the cell is not improved, then the cycle may repeat and user might not get resources to schedule its uplink data.

The system can release the UE (100):
1. The user of the UE (100) may release from the cell and result in call drop.
2. The user of the UE (100) might reattach to the same cell because of cell selection priority. The UE (100) may repeat the process from step 1. If the situation of the cell is not improved, then the cycle may repeat and user might not get resources to schedule its uplink data.
3. Can Re-allocate the PUCCH Resources.
4. gNodeB can re-allocate the PUCCH Resources so that UE can again send the Scheduling Request.

5. UE may repeat the process from step 1. If the situation of the cell is not improved, then the cycle may repeat and user might not get resources to schedule its uplink data.

Thus, it is desired to address the above mentioned disadvantages or other shortcomings or at least provide a useful alternative.

SUMMARY

Embodiments of the disclosure provide a method and a network apparatus for provisioning mobility management during congestion in a wireless network.

Embodiments of the disclosure maintain a neural network per UE to detect a UL congestion based on a UE buffer status report and available uplink resource and perform mobility action. The method can be used to provide a prediction based on several factors including UE specific inputs (like priority of service, location, battery left) and information about the base station will also be used to find out the availability of the UL resource.

Embodiments of the disclosure provide a machine learning/artificial intelligence recommender system for recommending the best target cell based on the UL Congestion prediction in a Cloud/centralized Radio Access Network (CRAN)/Virtualized radio access networks (VRAN)/Open Radio Access Network (O-RAN) systems. This recommender system can be implemented in cloud with ease. The centralized CRAN/VRAN/ORAN are equipped with machine learning/AI computing modules (e.g., for example, intelligence RAN controller in ORAN systems) that compute optimal Target cell and predict the UL Congestion according to the service requirement of the UEs. UL Congestion and target prediction by AI which can be implemented using Deep Reinforcement Learning. AI can be implemented in a flexible manner for heterogeneous/homogeneous systems. Cloud systems can move the users from one technology to another technology (and/or) moving the spectrum from one band/technology to another band/technology.

Embodiments of the disclosure provide an earlier detection of overload/congestion in UL Resource in cell and perform mobility (e.g., forced mobility) for those UEs to less loaded cell there by reducing the service disruption due congestion scenario.

Accordingly, an example embodiment of the disclosure provides a method for provisioning mobility management during congestion in a wireless network. The method includes: detecting, by a network apparatus in the wireless network, a plurality of parameters of a current cell associated with at least one user equipment (UE) in the wireless network; predicting, by the network apparatus, an uplink (UL) congestion condition with an uplink radio resource of the current cell by applying at least one machine learning model on the plurality of parameters of the current cell; performing, by the network apparatus, a mobility of the at least one UE from the current cell to at least one target cell in the wireless network based on the predicted UL congestion condition with the uplink radio resource of the current cell associated with the at least one UE.

According to an example embodiment, detecting the plurality of parameters of the current cell associated with the at least one UE in the wireless network includes: receiving, by the network apparatus, a Scheduling Request (SR) from the at least one UE associated with the current cell for providing a UL Grant for uplink data transmission, detecting by the network apparatus, unavailability of uplink resources in response to the SR, and detecting, by a network apparatus in the wireless network, a plurality of parameters of the current cell in response to detecting unavailability of the uplink resources.

According to an example embodiment, performing the forced mobility of the at least one UE from the current cell to at least one target cell in the wireless network based on the predicted UL congestion condition with the uplink radio resource of the current cell associated with the at least one UE includes: predicting, by the network apparatus, the at least one target cell in vicinity to the current cell and a plurality of parameters associated with the at least one predicted target cell by applying at least one machine learning on a plurality of characteristics of each cell in the wireless network, wherein the at least one target cell has a less load of congestion than the predicted UL congestion condition of the current cell, selecting, by the network apparatus, the at least one predicted target cell, and performing, by the network apparatus, a forced mobility (e.g., handover procedure or the like) of the at least one UE from the current cell to the at least one predicted target cell.

According to an example embodiment, the plurality of characteristic of each cell in the wireless network includes: at least one of a UL congestion condition of each cell in the wireless network, a UE traffic data type at each cell in the wireless network, a UE priority type at of each cell in the wireless network, a non-acknowledges/acknowledge (NACKS/ACK) statistics of each cell in the wireless network, throughput requirements of each cell in the wireless network, a guaranteed bit rate (GBR) and non-GBR queue lengths of each cell in the wireless network, an interference statistics of each cell in the wireless network, a CPU utilisation of each cell in the wireless network, a physical resource block usage of each cell in the wireless network, a user patterns of each cell in the wireless network, a channel status of each cell in the wireless network, a cell history on various call statistics of each cell in the wireless network, and key performance indicators of each cell in the wireless network.

According to an example embodiment, the key performance indicators include at least one of a mobility/handover success related information of each cell in the wireless network, a radio resource usage information of each cell in the wireless network, or a cell capability information of each cell in the wireless network.

According to an example embodiment, the plurality of parameters associated with the at least one predicted target cell include: at least one of a Modulation and Coding Scheme (MCS) for required for each service available at the at least one predicted target cell, a number of Bandwidth parts (BWPs) available at the at least one predicted target cell, a number of active BWP for the at least one UE at the at least one predicted target cell, a service grouping based on quality of service (QoS) class identifier (QCI) of the at least one predicted target cell, a BWP and QCI group mapping at the at least one predicted target cell.

According to an example embodiment, the plurality of parameters associated with the current cell includes: at least one of a buffer status report received from the at least one UE at the current cell, available uplink resources at the current cell, a service requirement of the at least one UE associated with the current cell, a services type provided by the current cell to the at least one UE, Block Error Rate (BLER) requirements of the current cell, a packet loss tolerance of the current cell, a category of the at least one UE associated with the current cell, a total system bandwidth (BW) of the current cell, a system QCI load statistics of the current cell, a coherence time of the current cell, and a coherence BW of the current cell, UE information associated with the current cell, a category and type of the at least one UE associated with the current cell, a current date and time, an identifier of the network apparatus, a frequency of operation of the current cell, a location of the at least one UE associated with the current cell, a density of the traffic at the current cell, a distribution of the traffic at the current cell, current climate conditions faced by the current cell, special occasions in location of the current cell, NACKS/ACK statistics, throughput requirements of the current cell, a GBR and non-GBR queue lengths of the current cell, an interference statistics of the current cell, a CPU utilisation of the current cell, a physical resource block usage of the current cell, a user patterns associated with the current cell, a channel status of the current cell, a cell history on various call statistics, and key performance indicators of the current cell.

According to an example embodiment, the special occasions comprises: at least one of festivals information in location of the current cell, functions information in location of the current cell, calendar based events information in location of the current cell, vacation information in location of the current cell, offer in location of the current cell.

According to an example embodiment, the network apparatus includes: one of a base station, a centralized server handling different base stations in the wireless network, a Virtualized radio access networks (vRANs), Open Radio Access Network (O-RAN), a Cloud Radio Access Network (CRAN), a Distributive server handling different base stations in the wireless network, and an Edge server handling different base stations in the wireless network.

According to an example embodiment, the method includes: creating and training the at least one machine learning model per UE or per network apparatus or per Quality of Service (QoS) Class Identifier (QCI) basis in the wireless network to detect the UL Congestion based on the plurality of parameters, wherein the at least one machine learning model is hosted in at least one of a base station in the wireless network, a Virtualized radio access networks (vRANs) in the wireless network, Open Radio Access Network (O-RAN) in the wireless network, and a Cloud Radio Access Network (CRAN) in the wireless network.

Accordingly, an example embodiment provides a network apparatus for provisioning mobility management during congestion in a wireless network. The network apparatus includes: a memory comprising information of cells and user equipments (UEs) available in the wireless network, a processor connected to the memory, and a mobility management controller communicatively connected to the memory and the processor. The mobility management controller is configured to: detect a plurality of parameters of a current cell associated with at least one UE in the wireless network; predict a UL congestion condition with an uplink radio resource of the current cell by applying at least one machine learning model on the plurality of parameters of the current cell; perform a forced mobility of the at least one UE from the current cell to at least one target cell in the wireless network based on the predicted UL congestion condition with the uplink radio resource of the current cell associated with the at least one UE.

Accordingly, an example embodiment provides a method for provisioning mobility management during congestion in a wireless network. The method includes: detecting, by a network apparatus in the wireless network, a plurality of parameters of a current cell associated with at least one User Equipment (UE) in the wireless network; predicting, by the network apparatus, an uplink (UL) congestion condition with an uplink radio resource of the current cell; determining, by the network apparatus, a mobility of the at least one UE from the current cell to at least one target cell in the wireless network based on the predicted UL congestion condition with the uplink radio resource of the current cell associated with the at least one UE.

Accordingly, an example embodiment provides a network apparatus for provisioning mobility management during congestion in a wireless network. The network apparatus includes: a memory comprising information of cells and user equipments (UEs) available in the wireless network, a processor connected to the memory, and a mobility management controller communicatively connected to the memory and the processor. The mobility management controller is configured to: detect a plurality of parameters of a current cell associated with at least one User Equipment (UE) in the wireless network; predict a UL congestion condition with an uplink radio resource of the current cell; determine a mobility of the at least one UE from the current cell to at least one target cell in the wireless network based on the predicted UL congestion condition with the uplink radio resource of the current cell associated with the at least one UE.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure without departing from the scope thereof, and the embodiments herein include all such modifications.

BRIEF DESCRIPTION OF THE DRAWINGS

The method and wireless network are illustrated in the accompanying drawings, throughout which like reference letters indicate corresponding parts in the various figures. The above and other aspects, features and advantages of certain embodiment of the present disclosure will be more apparent from the following detailed description, taken in conjunction with the accompanying drawings, in which.

DETAILED DESCRIPTION

Figure 1:
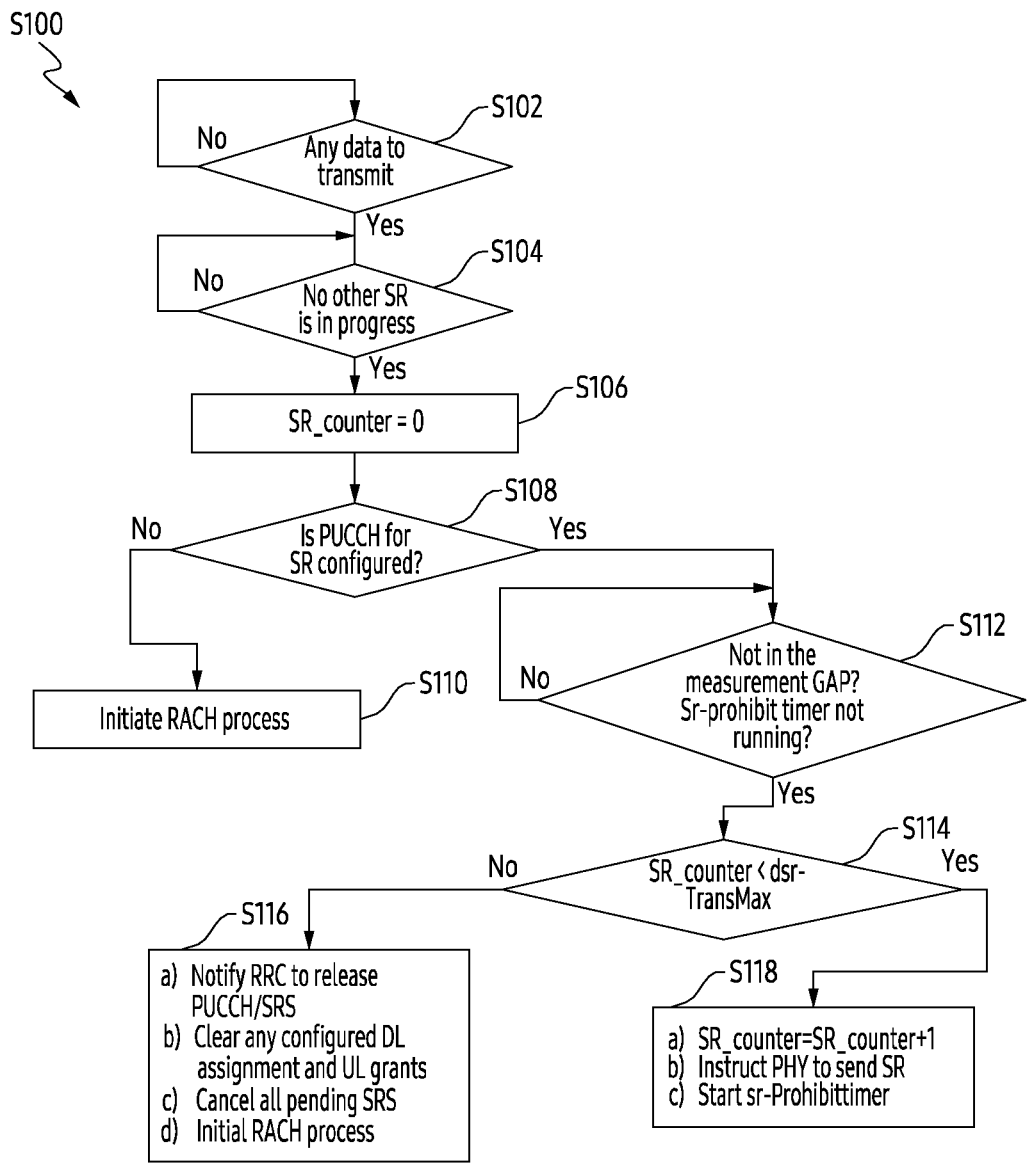
FIGS. 1 and 2 are diagrams illustrating existing congestion systems, according to the prior art.
Figure 2:
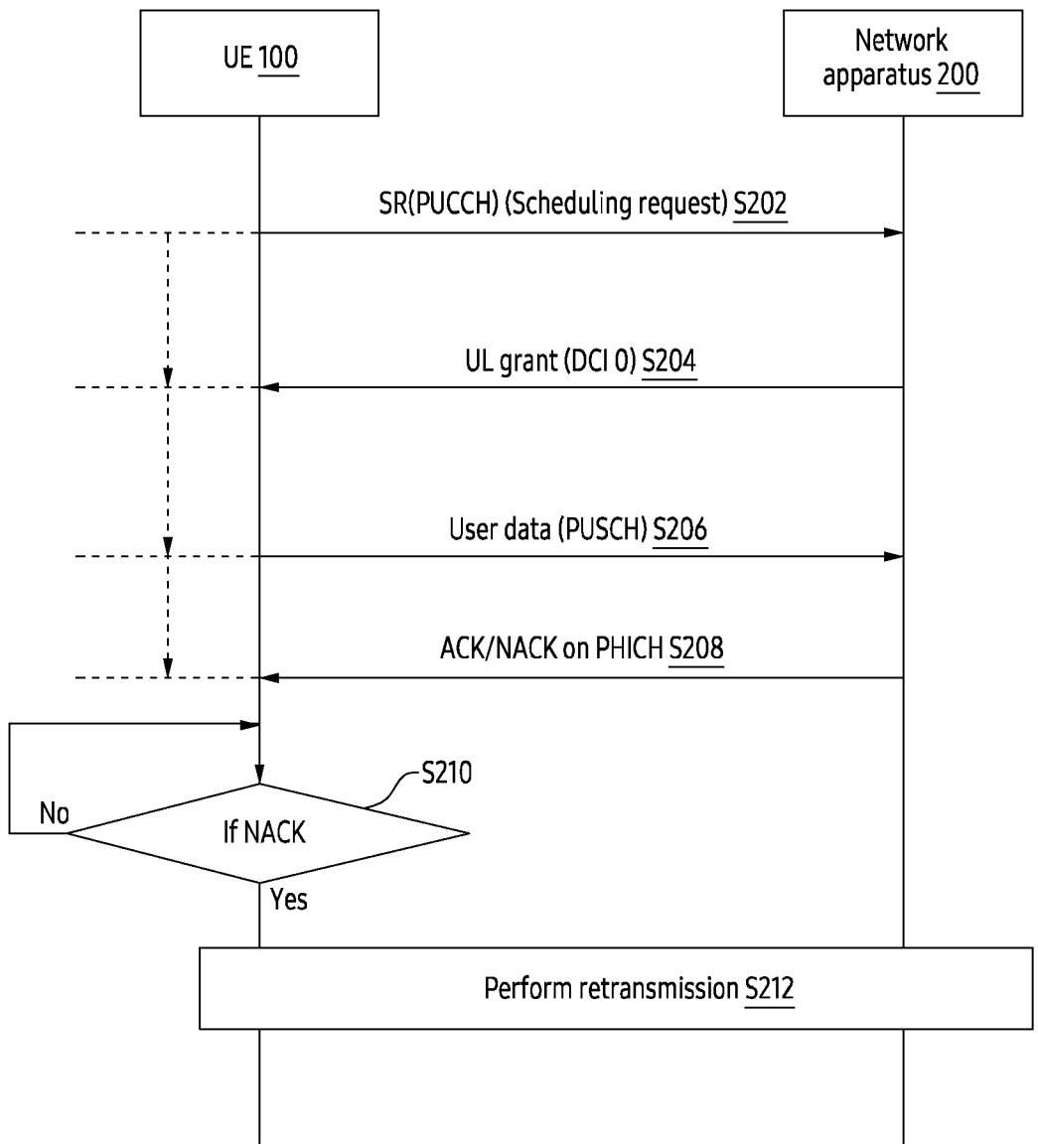
Figure 3:
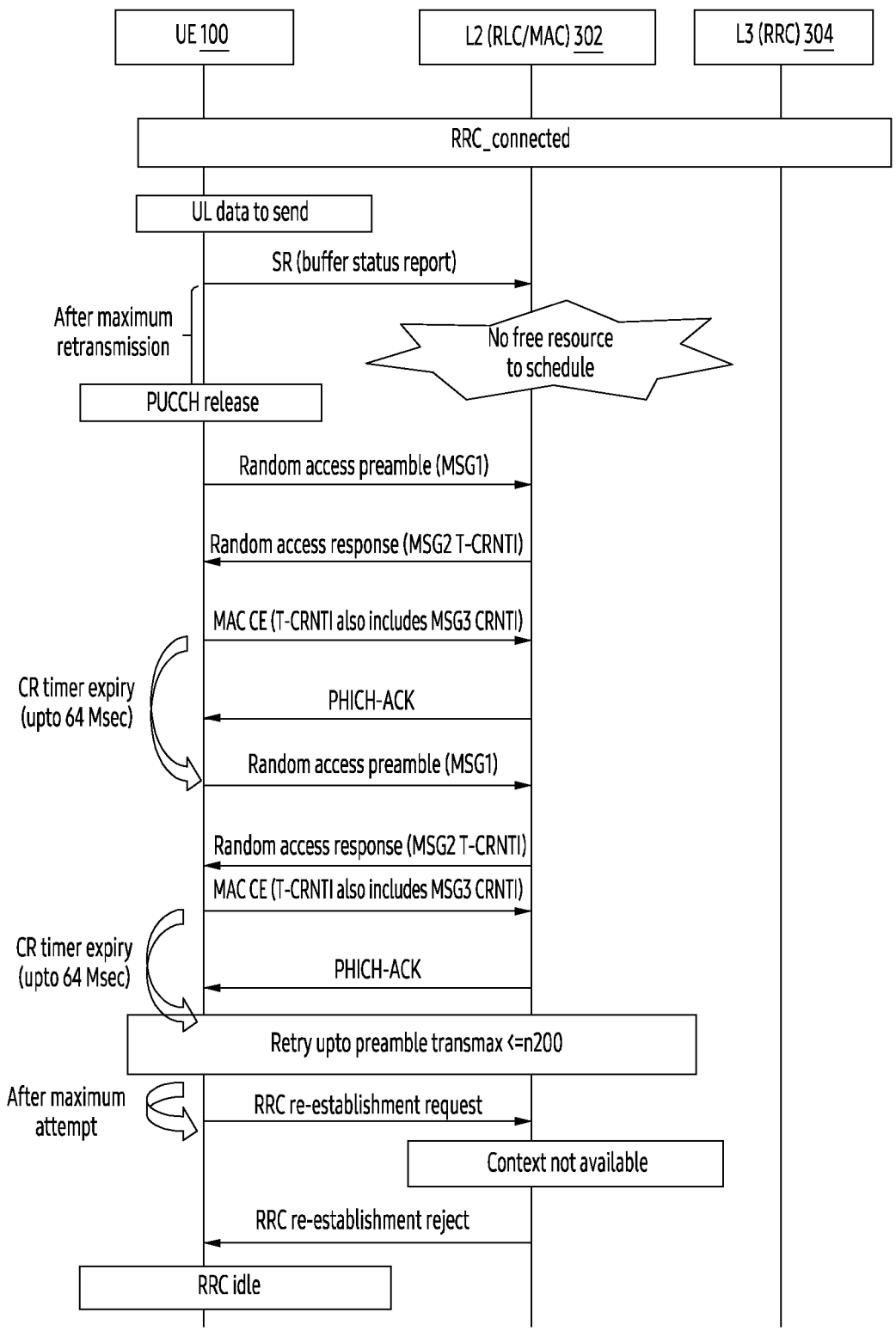
FIG. 3 is a diagram illustrating a scenario of a UE sending a MAC scheduling request, according to the prior art.

The various example embodiments herein and the various features and advantageous details thereof are explained in greater detail below with reference to the various non-limiting examples that are illustrated in the accompanying drawings and detailed in the following description. Descriptions of well-known components and processing techniques may be omitted so as to not unnecessarily obscure the embodiments herein. The various embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly an example embodiment herein provides a method for provisioning mobility management during congestion in a wireless network. The method includes detecting, by a network apparatus in the wireless network, a plurality of parameters of a current cell associated with at least one UE in the wireless network. Further, the method includes predicting, by the network apparatus, a UL congestion condition with an uplink radio resource of the current cell by applying at least one machine learning model on the plurality of parameters of the current cell. Further, the method includes performing, by the network apparatus, a forced mobility of the at least one UE from the current cell to at least one target cell in the wireless network based on the predicted UL congestion condition with the uplink radio resource of the current cell associated with the at least one UE.

The disclosed method can be used to reduce the latency and service interruption in the event of resource unavailability by intelligently move the user to a better cell based on a Quality of Service (QoS), throughput requirements. Further, the disclosed method can be used at Base Station/Virtual RAN/Open RAN/Centralized RAN (BS/VRAN/ORAN/CRAN) systems. Further, the disclosed method can applied as offline solution, online solution or hybrid solution. Furthermore, the disclosed method can run the Machine Learning/Artificial Intelligence (ML/AI) algorithm in a Random Access Network (RAN) intelligence module.

Based on the disclosed method, the network apparatus will provide earlier detection of overload/congestion in uplink radio resource in the cell and perform forced mobility for effected users to less loaded cell there by avoid the service disruption due congestion scenario.

Referring now to the drawings and more particularly to FIGS. 4 through 14, where similar reference characters denote corresponding features consistently throughout the figures, there are illustrated an described various example embodiments.

Figure 4:
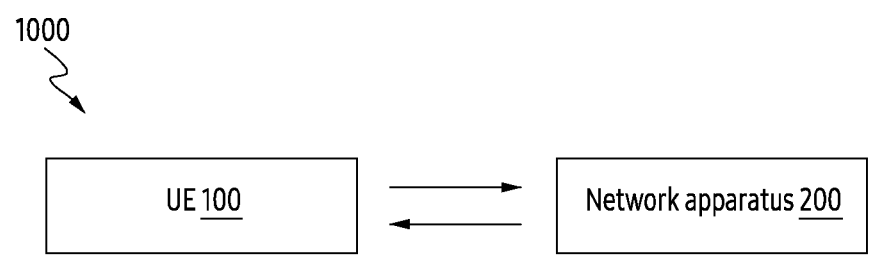
FIG. 4 is a block diagram illustrating an example configuration of a wireless network for provisioning mobility management during congestion, according to various embodiments.

FIG. 4 is a block diagram illustrating an example configuration of a wireless network (1000) for provisioning mobility management during congestion, according to various embodiments. In an embodiment, the wireless network (1000) includes a UE (100) and a network apparatus (200). The UE (100) can be, for example, but not limited to a cellular phone, a smart phone, a Personal Digital Assistant (PDA), a tablet computer, a laptop computer, an Internet of Things (IoT), embedded systems, edge devices, or the like. The network apparatus (200) can be, for example, but not limited to a base station, a centralized server handling different base stations in the wireless network (1000), a Virtualized radio access networks (vRANs), Open Radio Access Network (O-RAN), a Cloud Radio Access Network (CRAN), a Distributive server handling different base stations in the wireless network (1000), and an Edge server handling different base stations in the wireless network (1000).

The network apparatus (200) detects a plurality of parameters of a current cell associated with the at least one UE (100) in the wireless network (1000). The plurality of characteristics of each cell in the wireless network (1000) can be, for example, but not limited to a UL congestion condition of each cell in the wireless network (1000), a UE traffic data type at each cell in the wireless network (1000), a UE priority type at each cell in the wireless network (1000), a NACKS/ACK statistics of each cell in the wireless network (1000), throughput requirements of each cell in the wireless network (1000), a GBR and non-GBR queue lengths of each cell in the wireless network (1000), an interference statistics of each cell in the wireless network (1000), a CPU utilisation of each cell in the wireless network (1000), a physical resource block usage of each cell in the wireless network (1000), a user patterns of each cell in the wireless network (1000), a channel status of each cell in the wireless network (1000), a cell history on various call statistics of each cell in the wireless network (1000), and key performance indicators of each cell in the wireless network (1000). The key performance indicators includes a handover/mobility success related information of each cell in the wireless network (1000), a radio resource usage information of each cell in the wireless network (1000), or a cell capability information of each cell in the wireless network (1000).

In an embodiment, the network apparatus (200) may receive a SR from the at least one UE (100) associated with the current cell for providing a UL grant for uplink data transmission. Further, the network apparatus (200) detects unavailability of uplink resources in response to the SR and detect a plurality of parameters of the current cell.

Further, the network apparatus (200) predicts a UL congestion condition with an uplink radio resource of the current cell by applying at least one machine learning model on the plurality of parameters of the current cell. Further, the network apparatus (200) performs a forced mobility of the at least one UE (100) from the current cell to at least one target cell in the wireless network (1000) based on the predicted UL congestion condition with the uplink radio resource of the current cell associated with the at least one UE (100).

In an embodiment, the network apparatus (200) predicts the at least one target cell in vicinity to the current cell and a plurality of parameters associated with the at least one predicted target cell by applying at least one machine learning on a plurality of characteristics of each cell in the wireless network (1000). The at least one target cell has a less load of congestion than the predicted UL congestion condition of the current cell. Further, the network apparatus (200) selects the at least one predicted target cell and performs the forced mobility of the at least one UE (100) from the current cell to the at least one predicted target cell.

The plurality of parameters associated with the at least one predicted target cell includes a Modulation and Coding Scheme (MCS) for required for each service available at the at least one predicted target cell, a number of Bandwidth parts (BWPs) available at the at least one predicted target cell, a number of active BWP for the at least one UE (100) at the at least one predicted target cell, a service grouping based on QCI of the at least one predicted target cell, a BWP and QCI group mapping at the at least one predicted target cell. Further, the plurality of parameters associated with the current cell includes a buffer status report received from the at least one UE (100) at the current cell, available uplink resources at the current cell, a service requirement of the at least one UE (100) associated with the current cell, a services type provided by the current cell to the at least one UE (100), Block Error Rate (BLER) requirements of the current cell, a packet loss tolerance of the current cell, a category of the at least one UE (100) associated with the current cell, a total system bandwidth (BW) of the current cell, a system QCI load statistics of the current cell, a coherence time of the current cell, and a coherence BW of the current cell, UE information associated with the current cell, a category and type of the at least one UE (100) associated with the current cell, a current date and time, an identifier of the network apparatus (200), a frequency of operation of the current cell, a location of the at least one UE (100) associated with the current cell, a density of the traffic at the current cell, a distribution of the traffic at the current cell, current climate conditions faced by the current cell, special occasions in location of the current cell, NACKS/ACK statistics, throughput requirements of the current cell, a GBR and non-GBR queue lengths of the current cell, an interference statistics of the current cell, a CPU utilisation of the current cell, a physical resource block usage of the current cell, a user patterns associated with the current cell, a channel status of the current cell, a cell history on various call statistics, and key performance indicators of the current cell, wherein the key performance indicators comprises a handover/mobility success related information of the current cell, a radio resource usage information of the current cell, or a cell capability information of the current cell, and wherein the special occasions comprising festivals information in location of the current cell, functions information in location of the current cell, calendar based events information in location of the current cell, vacation information in location of the current cell, offer in location of the current cell.

Further, the network apparatus (200) creates and trains the at least one machine learning model per UE or per network apparatus or per QoS Class Identifier (QCI) basis in the wireless network (1000) to detect the UL Congestion based on the plurality of parameters, wherein the at least one machine learning model is hosted in at least one of a base station in the wireless network (1000), a Virtualized radio access networks (vRANs) in the wireless network (1000), Open Radio Access Network (O-RAN) in the wireless network (1000), and a Cloud Radio Access Network (CRAN) in the wireless network (1000).

Figure 5:
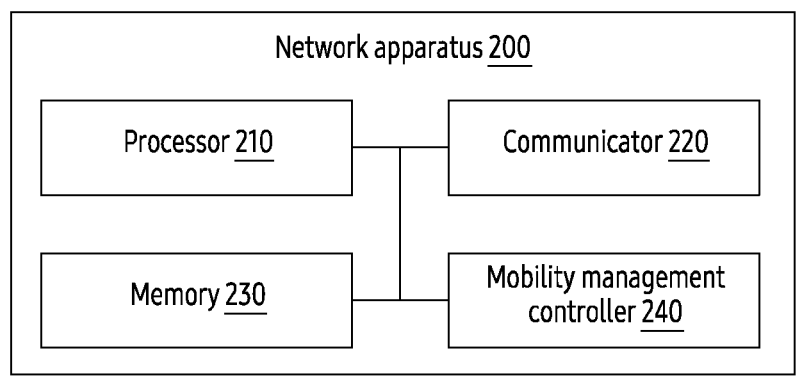
FIG. 5 is a block diagram illustrating an example configuration of a network apparatus, according to various embodiments.

FIG. 5 is a block diagram illustrating an example configuration of the network apparatus (200), according to various embodiments. In an embodiment, the network apparatus (200) includes a processor (e.g., including processing circuitry) (210), a communicator (e.g., including communication circuitry) (220), a memory (230) and a mobility management controller (e.g., including processing/control circuitry) (240). The processor (210) is coupled with the communicator (220), the memory (230) and the mobility management controller (240).

The mobility management controller (240) may include various processing/control circuitry and detects the plurality of parameters of the current cell associated with the at least one UE (100) in the wireless network (1000). In an embodiment, the mobility management controller (240) receives the SR from the at least one UE (100) associated with the current cell for providing the UL grant for uplink data transmission. Further, the mobility management controller (240) detects unavailability of uplink resources in response to the SR and detect a plurality of parameters of the current cell.

Further, the mobility management controller (240) predicts the UL congestion condition with the uplink radio resource of the current cell by applying at least one machine learning model on the plurality of parameters of the current cell. Further, the mobility management controller (240) performs the forced mobility of the at least one UE (100) from the current cell to at least one target cell in the wireless network (1000) based on the predicted UL congestion condition with the uplink radio resource of the current cell associated with the at least one UE (100).

In an embodiment, the mobility management controller (240) predicts the at least one target cell in vicinity to the current cell and the plurality of parameters associated with the at least one predicted target cell by applying at least one machine learning on a plurality of characteristics of each cell in the wireless network (1000). The at least one target cell has a less load of congestion than the predicted UL congestion condition of the current cell. Further, the mobility management controller (240) selects the at least one predicted target cell and performs the forced mobility of the at least one UE (100) from the current cell to the at least one predicted target cell.

Further, the mobility management controller (240) creates and trains the at least one machine learning model per UE or per network apparatus or per QoS Class Identifier (QCI) basis in the wireless network (1000) to detect the UL Congestion based on the plurality of parameters.

The mobility management controller (240) may be physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (210) may include various processing circuitry and is configured to execute instructions stored in the memory (230) and to perform various processes. The communicator (220) may include various communication circuitry and is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although FIG. 5 shows various hardware components of the network apparatus (200) it is to be understood that other embodiments are not limited. In various embodiments, the network apparatus (200) may include less or more number of components. Further, the labels or names of the components are used only for illustrative purpose and does not limit the scope of the disclosure. One or more components can be combined together to perform same or substantially similar function in the network apparatus (200).

Figure 6:
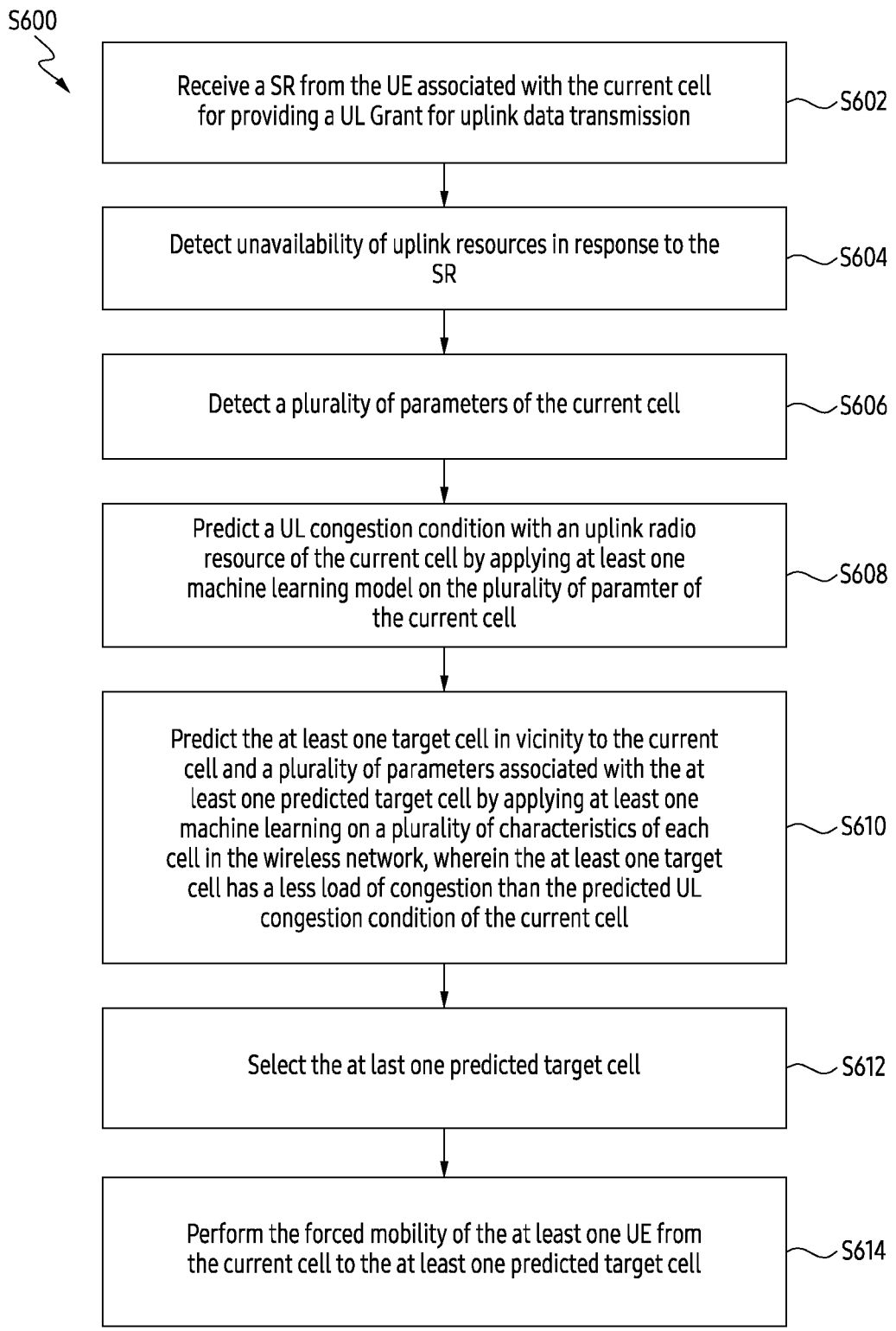
FIG. 6 is a flowchart illustrating an example method for provisioning mobility management during congestion in the wireless network, according to various embodiments.

FIG. 6 is a flowchart (S600) illustrating an example method for provisioning mobility management during congestion in the wireless network (1000), according to various embodiments. The operations (S602-S612) may be performed by the mobility management controller (240).

At S602, the method includes receiving the SR from the UE (100) associated with the current cell for providing the UL grant for uplink data transmission. At S604, the method includes detecting the unavailability of uplink resources in response to the SR. At S606, the method includes detecting the plurality of parameters of the current cell. At S608, the method includes predicting the UL congestion condition with the uplink radio resource of the current cell by applying at least one machine learning model on the plurality of parameters of the current cell. At S610, the method includes predicting the at least one target cell in a vicinity of the current cell and a plurality of parameters associated with the at least one predicted target cell by applying at least one machine learning on a plurality of characteristics of each cell in the wireless network, wherein the at least one target cell has a less load of congestion than the predicted UL congestion condition of the current cell. At S612, the method includes selecting the at least one predicted target cell. At S614, the method includes performing the forced mobility of the at least one UE from the current cell to the at least one predicted target cell.

Based on the disclosed method, the network apparatus will earlier detection of overload/congestion in uplink radio resource in the cell and perform forced mobility for effected users to less loaded cell there by avoid the service disruption due congestion scenario. This will improve the user experience of the users and reduce service interruption and improves the spectrum efficiency.

Figure 7:
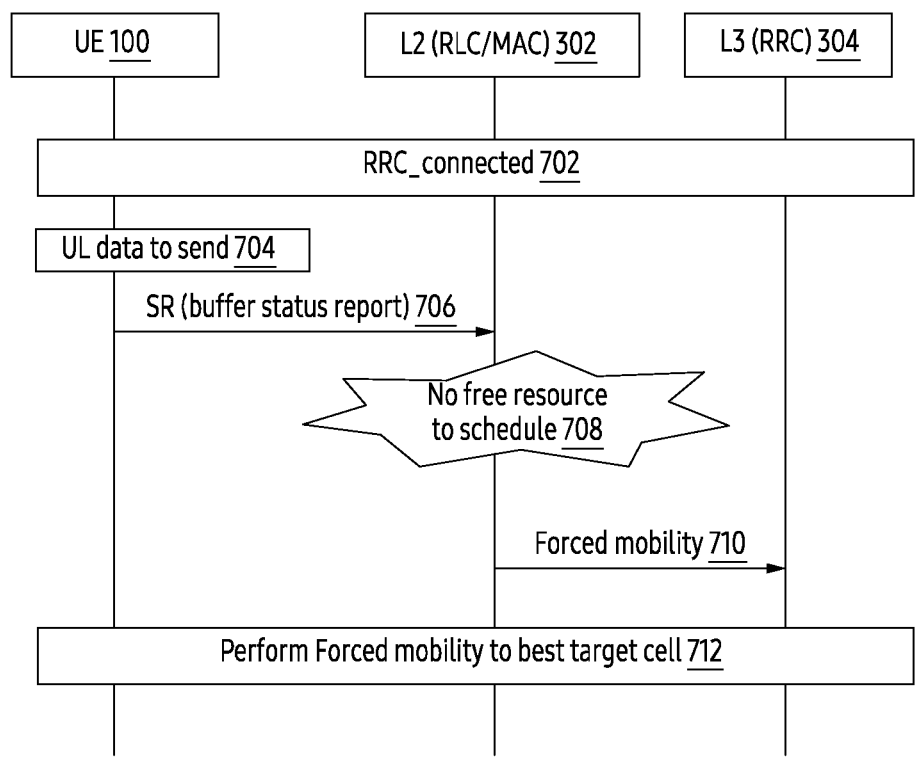
FIG. 7 is a signal flow diagram of an example operation in which an intelligent mobility during UL congestion without ML/AL illustrated, according to various embodiments.

FIG. 7 is a signal flow diagram illustrating an example intelligent mobility operation during UL congestion without ML/AL, according to various embodiments. Referring to FIG. 7, at 702, the RRC_connected is between the UE (100), the L2 RLC/MAC (302) and the L3 RRC layer (304). At 704, the UE (100) sends the UL data to a network apparatus (200). At 706, the UE (100) sends the SR including the buffer status report to the L2. At 708, L2 determines that no free resource to schedule. At 710, L2 triggers the forced mobility/handover to the L3. At 712, the forced mobility is performed to best target cell.

The call flow shows the disclosed behaviour when Uplink resources are not available.

The user of the UE (100) will send the SR to the MAC layer for providing the UL grant for uplink data transmission.

When the gNodeB lower layer detect the resource non availability, e.g., if the MAC Layer not able schedule UL grands to the UE (100) for the UL Data transmission due to non-availability of the PUCCH resources, the MAC layer will update the RRC Layer for initiate a forced mobility to its best neighbours cell where UE can send UL Traffic The gNodeB can take a decision on carrier/neighbour based on the local information available about the load information/Neighbours/and previous history for Key Performance Indicators like (e.g., handover/mobilitysuccess, radio resource usage, cell capability or the like).

The target Cell can be obtained based on the Neighbour Cell configuration present in the gNodeB Database and apply the various dependent factors mentioned in the Step3. In a cloud environment the CU is connected to multiple DUs and CU is aware about all the neighbour cells and their load and capabilities. So CU can determine the best possible candidate cell for handoff from its internal database information along with variable factors mentioned above.

Figure 8:
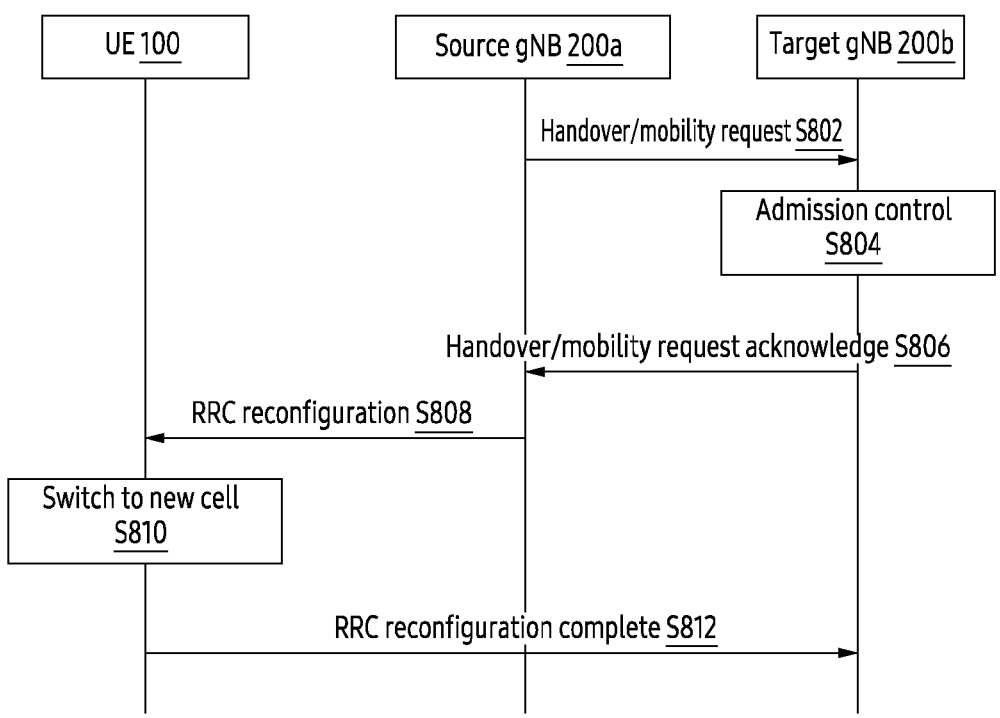
FIG. 8 is a signal flow diagram illustrating an example operation of intelligent mobility during UL congestion without ML/AL, according to various embodiments.

FIG. 8 is a signal flow diagram illustrating an example intelligent mobility during UL congestion without ML/AL, according to various embodiments.

At S802, the source gNB (200*a*) sends a handover/mobilityrequest to a target gNB (200*b*). At S804, the target gNB (200*b*) performs an admission control. At S806, the target gNB (200*b*) sends the handover/mobility request acknowledge to the source gNB (200*a*). At S808, the source gNB (200*a*) sends the RRC reconfiguration to the UE (100). At S810, the UE (100) switches to new cell. At S812, the UE (100) sends the RRC reconfiguration complete to the target gNB (200*b*).

Figure 9:
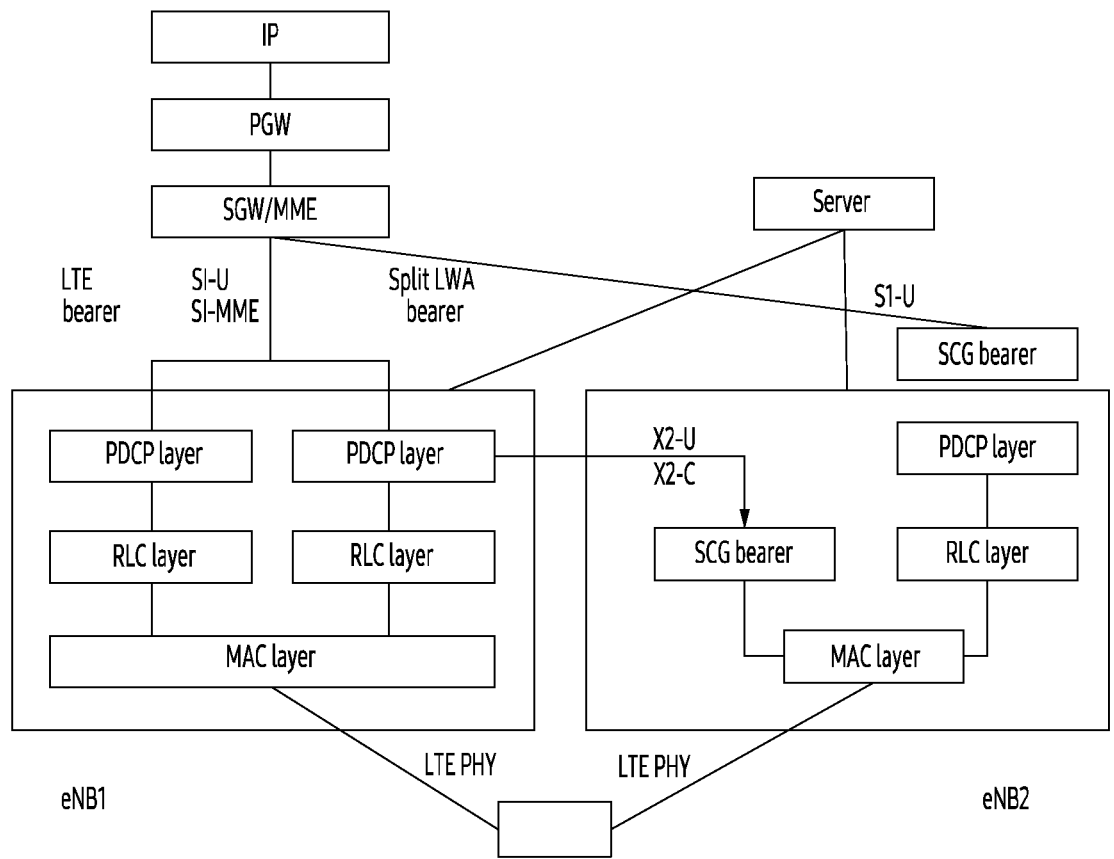
FIG. 9 is diagram in which an example intelligent mobility during UL congestion with ML/AL is illustrated, according to various embodiments.

FIG. 9 is a diagram illustrating an example intelligent mobility during UL congestion without ML/AL, according to various embodiments.

As shown in FIG. 9, the gNodeB can take a decision on carrier/neighbour based on the local information available about the load information/Neighbours/and previous history for Key Performance Indicators (like Handover/mobility Success, Radio Resource Usage, Cell Capability or the like). The target cell can be obtained based on the neighbour cell configuration present in the gNodeB database and apply the various dependent factors mentioned. In the cloud environment, the CU is connected to multiple DUs and the CU is aware about all the neighbour cells and their load and capabilities, so that the CU can determine the best possible candidate cell for handoff from its internal database information along with variable factors.

The disclosed ML/AI techniques will predict the base station and the UE Index based on NACKS/ACK stats, throughput requirements, GBR and non-GBR queue lengths of the users, interference stats, CPU Utilisation, Physical Resource Block usage, User Patterns, Channel Status, Cell history on various call statistics will improve the QoS experience and spectrum efficiency and improve user experience.

When the eNB detects no resources to honor the SR from the UE (100) due to overload/congestion then the eNB can trigger a forced mobility to the next best cell so that the UE (100) can resume the data transfer immediately rather than sending repeated SR request to same eNB.

The disclosed method can be used to maintain the sparse Neural Network on per UE or per BS or Per QCI basis in ML/AL recommender system for recommending the available target and predict the UL congestion in the CRAN/VRAN. This recommender system can be implemented using a neural network.

The sparse neural network neural network per UE detects the UL congestion based on UE buffer status report and available uplink resource and performs the mobility action. The method provides the prediction based on several factors including UE specific inputs (like priority of service, location, battery power or the like) and information about the base station will also is used to find out the availability of the UL Resource.

Sparse BS/CRAN/VRAN is equipped a neural network that available Target and predict the UL Congestion according to the service requirement of the UEs.

Following are example additional inputs to the neural network such as time, BS ID, Frequency of operation, Day details, Place of location, Density of the traffic, Distribution of the traffic, Climate conditions, Special occasions, Festivals and functions, Calendar based events, Vacation details/distribution, UE information, UE type/UE category/UE monthly package, Data type information, Measurements, Offers in malls/movie release dates, Sports/school/office events, NACKS/ACK stats, Throughput requirements, GBR and non-GBR queue lengths of the users, Interference stats, CPU Utilisation, Physical Resource Block usage, User Patterns, Channel Status, Cell history The BS/CRAN/VRAN is equipped a neural network that can detect the UL Congestion in the target cell and select a possible candidate Users for mobility. The Possible User prediction can be done based on the Uplink Resource Requirement of the application, user pattern. The System may consider various inputs from the Cell and Users and decide the target carrier/MCS/BWP according to the service requirement of the UEs. The UE sends the services related requirements to the BS like QoS. The BS uses the neural network to calculate the Target Carrier, BWP and MCS for each service. Having a centralized model increases the flexibility of Mobility handling.

For example, if the BS model finds that some particular service is being used by many UEs then it can mobilise the user where Uplink resources are more available and increase the BWP allocation from that particular service.

The disclosed distributed network reduces the time for deciding the target cell/target carrier/MCS/BWP. Further, the disclosed method is Easy Mobility handling; if the Target Carrier/MCS/BWP is not available then the nearest Target Carrier/MCS/BWP can be found. Furthermore, the disclosed method decreases the latency.

Figure 10:
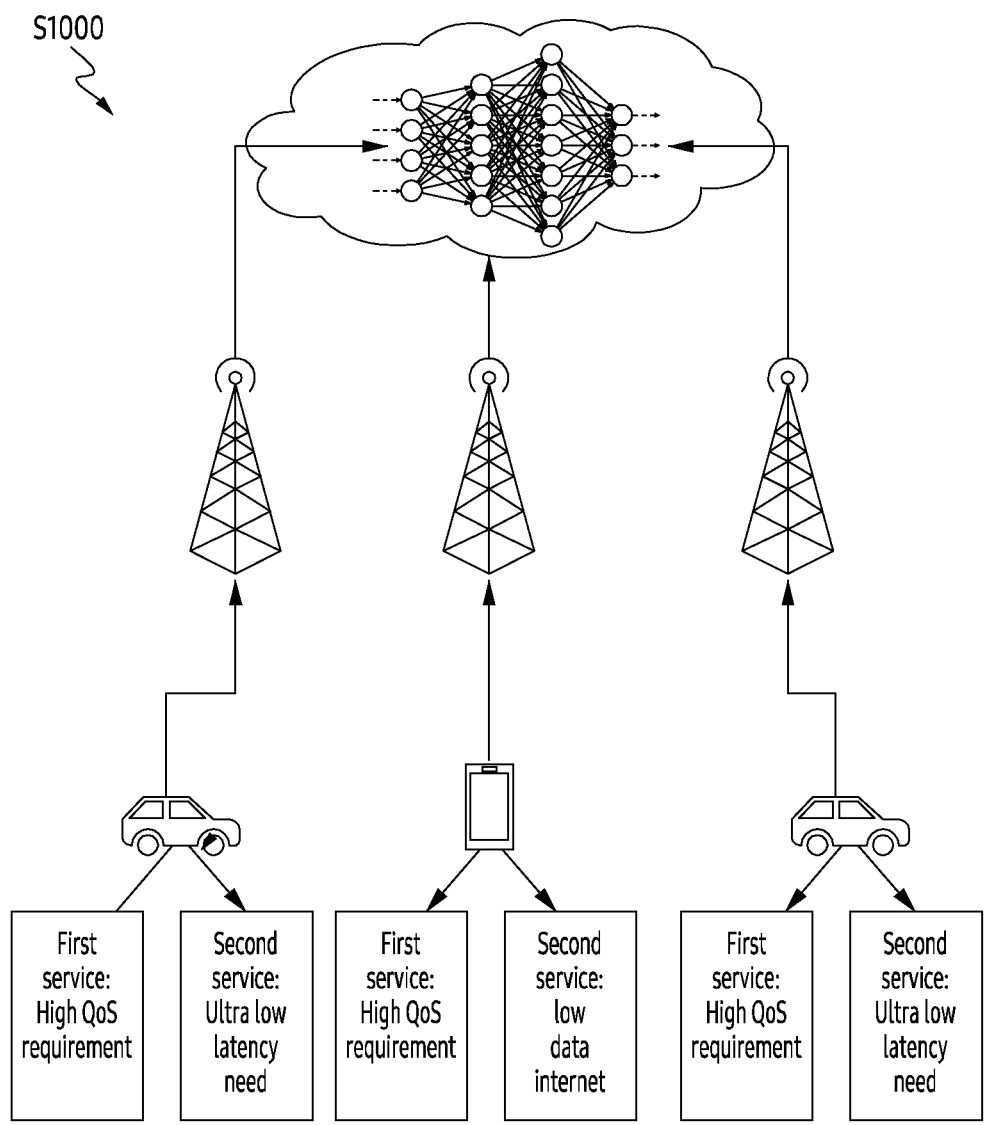
FIG. 10 is a diagram illustrating an example scenario in which the network apparatus provisions the mobility management during congestion in a centralized wireless network, according to various embodiments.

FIG. 10 is a diagram illustrating an example scenario (S1000) in which the network apparatus (200) provisions the mobility management during congestion in a centralized wireless network, according to various embodiments.

For example, the UE sends Scheduling Request for UL grant for data transmission. In case network didn't provide the grant, the UE may release its PUCCH after maximum retransmission and finally perform re-establishment. But the cell situation may if persists again, the user may end up with same situation as before. In order to avoid the service interruption, the gNB can early detect the congestion and handoff the UE to a target cell without service disruption.

Figure 11:
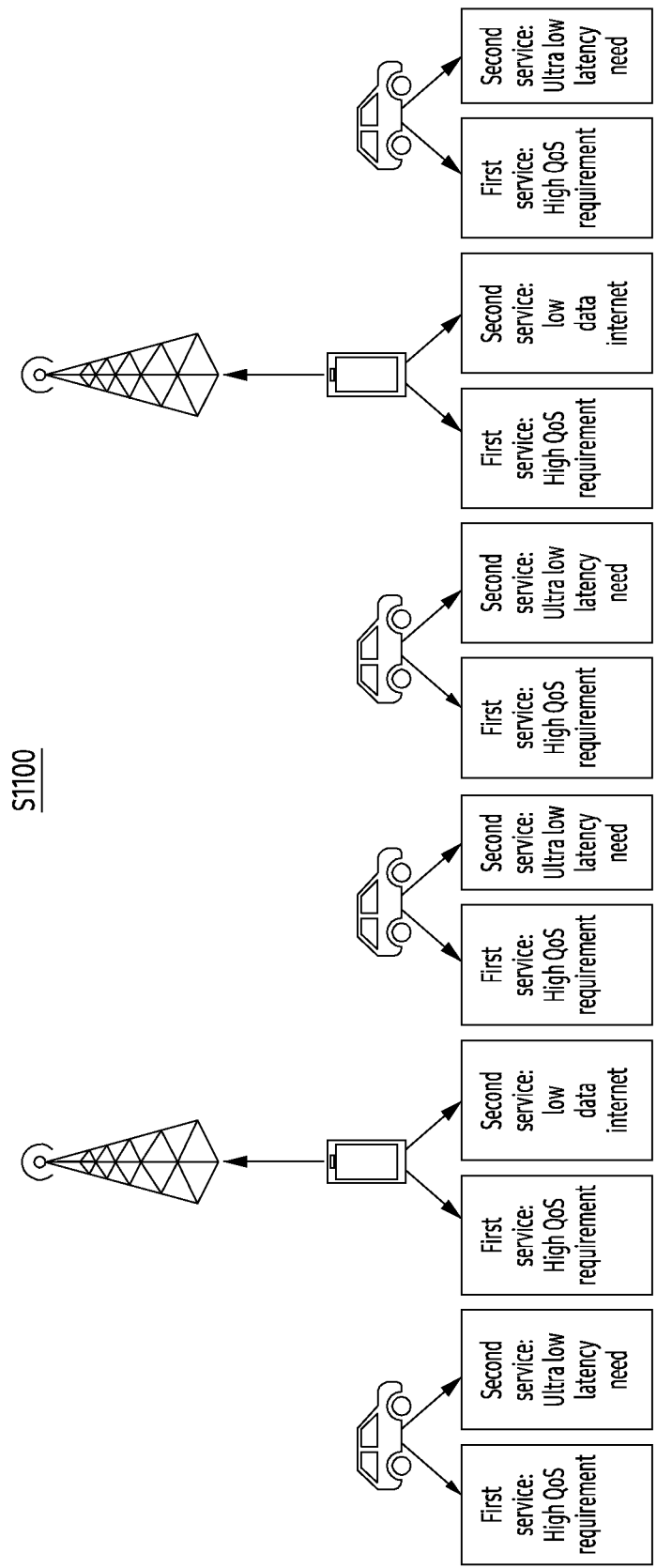
FIG. 11 is a diagram illustrating an example scenario in which the network apparatus provisions the mobility management during congestion in a centralized wireless network, according to various embodiments.

FIG. 11 is a diagram illustrating an example scenario (S1100) in which the network apparatus (200) provisions the mobility management during congestion in a centralized wireless network, according to various embodiments.

Referring to FIG. 11, the distributed neural network per UE to detect the UL Congestion based on the UE Buffer status Report and available uplink resource and perform mobility action. Prediction based on several factors including the UE specific inputs (like priority of service, location, battery left or the like) and information about the base station will also be used to find out the availability of the UL Resource.

The Distributed with ML/AL recommender system for recommending the available Target and predict the UL Congestion in the CRAN/VRAN. This recommender system can be implemented using a neural network.

Centralized BS/CRAN/VRAN is equipped a neural network that available Target and predict the UL Congestion according to the service requirement of the UEs. The UL Congestion and target prediction by AI which can be implemented using Reinforcement Learning, which in turn uses neural networks. AI can be implemented in a flexible manner.

Figure 12:
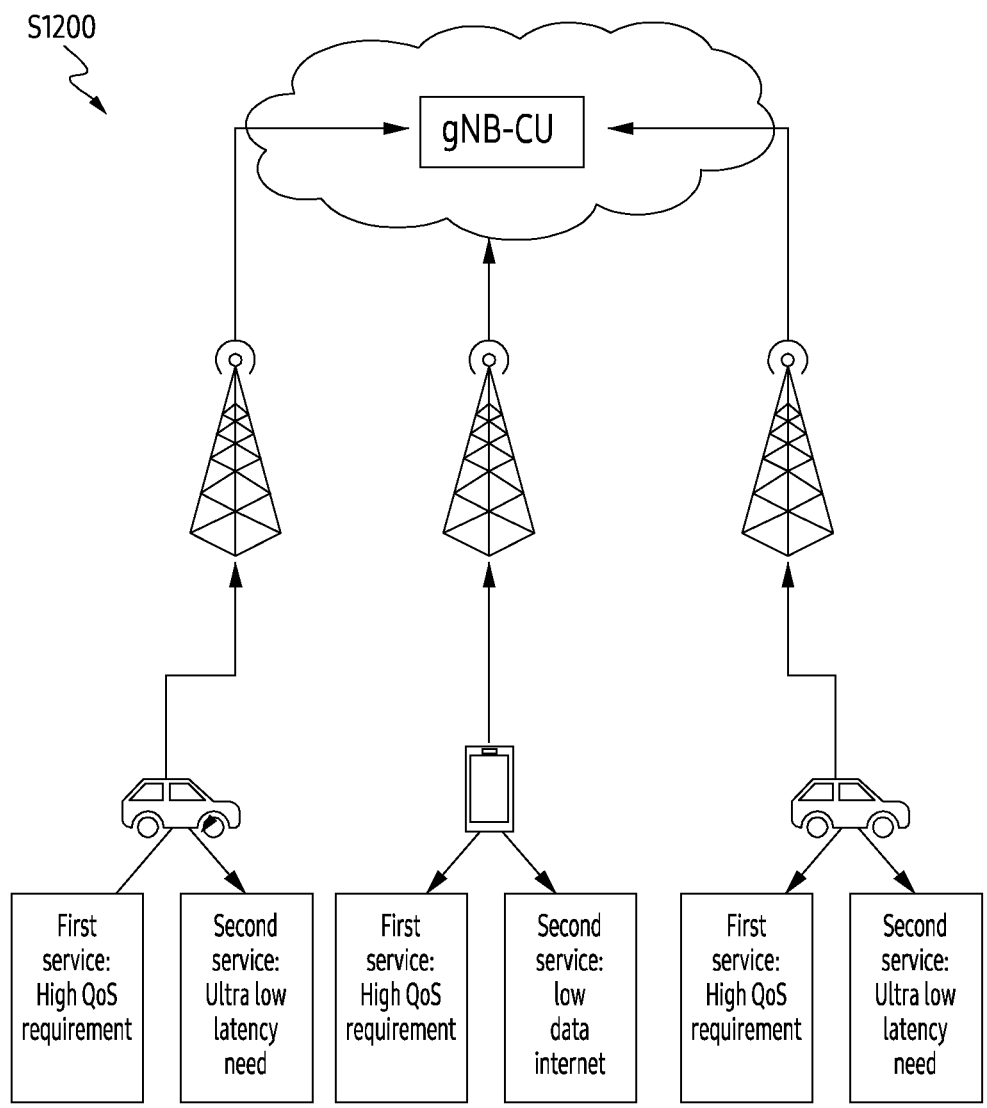
FIG. 12 is a diagram illustrating an example scenario in which the network apparatus provisions the mobility management during congestion in a centralized server, according to various embodiments.

FIG. 12 is a diagram illustrating an example scenario (S1200) in which the network apparatus (200) provisions the mobility management during congestion in a centralized server, according to various embodiments. FIG. 12 shows a centralized network architecture, where different base stations are controlled by centralized CU. Each BS/CRAN/VRAN is connected to the central cloud network (Like O-RAN/RIC) and RIC module that can detect the UL Congestion in the target cell and select a possible candidate Users for mobility. The Central cloud network is connected all gNodeBs in that cloud and received data from all gNodeBs, the possible user prediction can be done based on the uplink resource requirement of the application and the user pattern. The system may consider various inputs from the Cell and Users and decide the Target Carrier/MCS/BWP according to the service requirement of the UEs. The UE (100) sends the services related requirements to the BS like QoS. BS uses the neural network to calculate the Target Carrier, BWP and MCS for each service.

The disclosed method provides an optimal selection of mobility parameters and user configuration during mobility because the decision and selection consider all gnodes data in the cloud.

Figure 13:
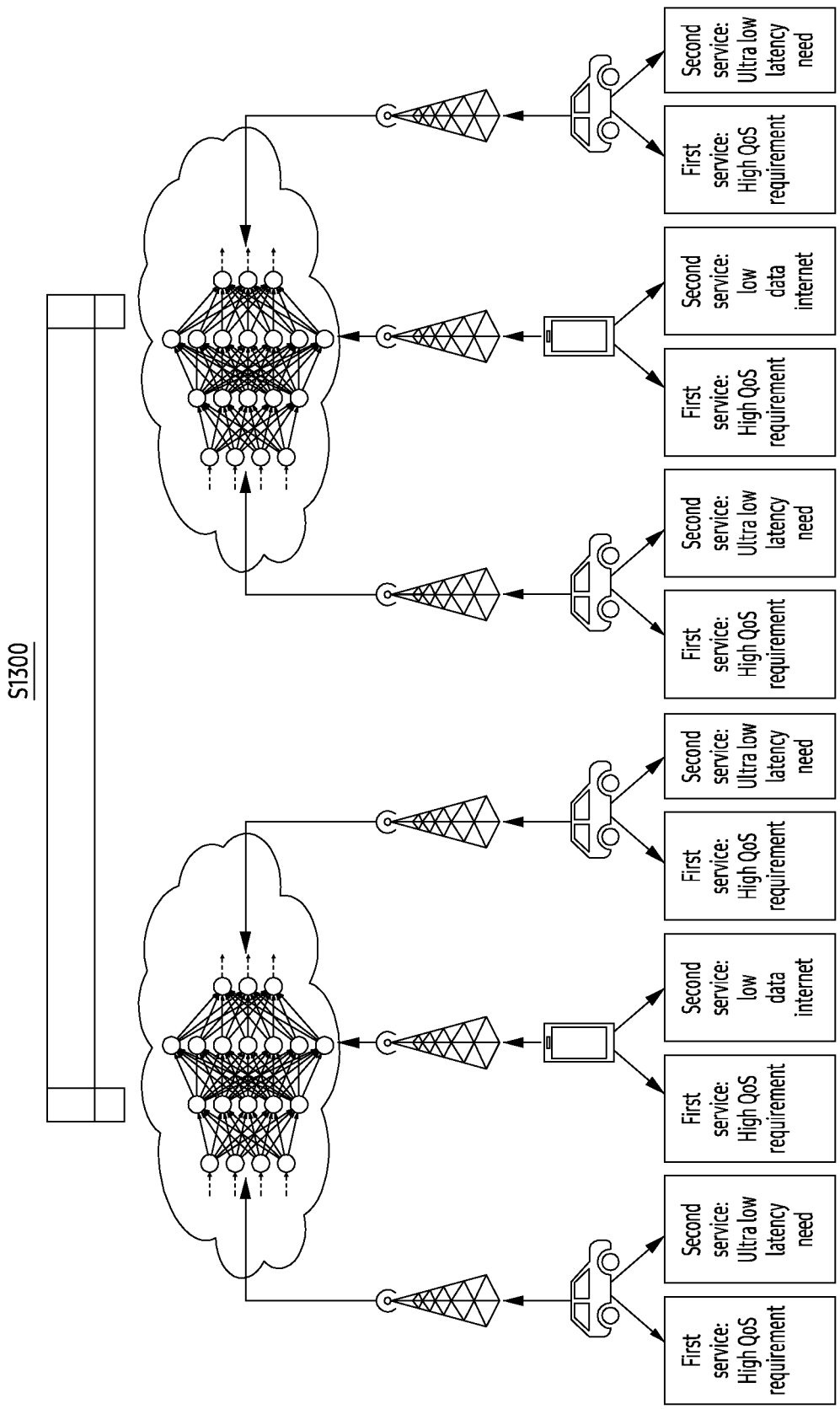
FIG. 13 is a diagram illustrating an example scenario in which the network apparatus provisions the mobility management during congestion in a centralized server-cloud edge environment, according to various embodiments.

FIG. 13 is a diagram illustrating an example scenario (S1300) in which the network apparatus (200) provisions the mobility management during congestion in a centralized server-cloud edge environment, according to various embodiments. FIG. 13 shows the centralized network architecture, where two different centralized network is connected through edge router. The centralized approach may consider inter cloud data exchange while considering the target base station. This situation may arise while user situated/mobile in the inter cluster border. Each BS/CRAN/VRAN is connected to the central cloud network (Like O-RAN/RIC) and RIC module is equipped a neural network that can detect the UL Congestion in the target cell and select a possible candidate Users for mobility. The central RIC Neural Network is connected all gNodeBs in that cloud and received data from all gNodeBs. The Possible User prediction can be done based on the Uplink Resource Requirement of the application, User pattern. The System may consider various inputs from the Cell and Users and decide the Target Carrier/MCS/BWP according to the service requirement of the UEs. The UE sends the services related requirements to the BS like QoS. BS uses the neural network to calculate the Target Carrier, BWP and MCS for each service.

Figure 14:
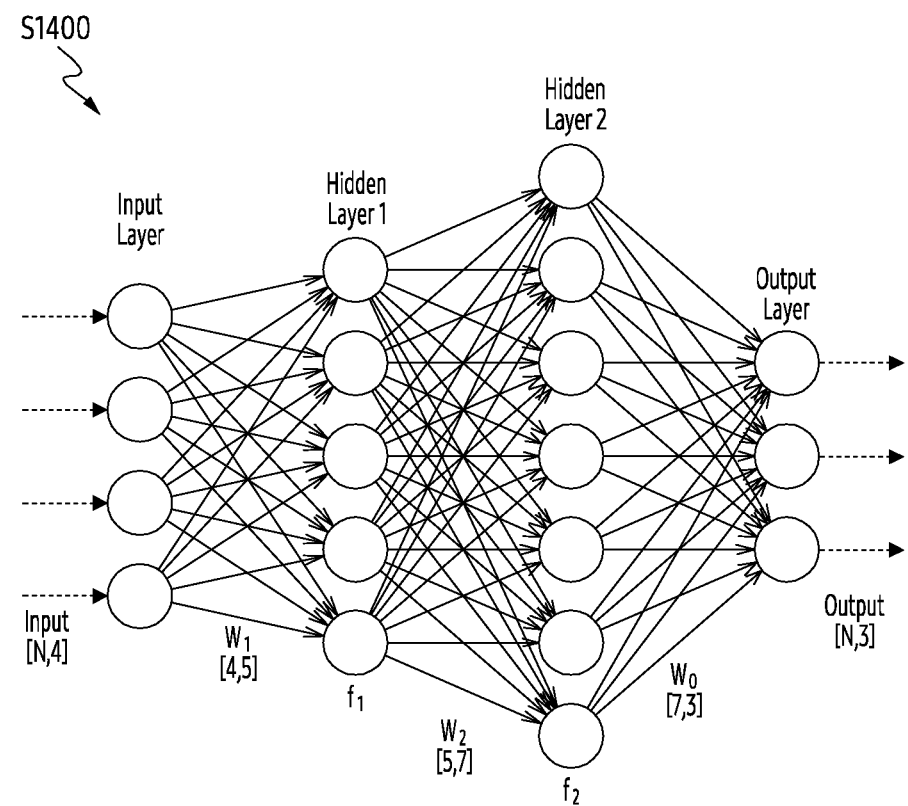
FIG. 14 is a diagram illustrating an example neural network architecture on per UE basis, according to various embodiments.

FIG. 14 is a diagram illustrating an example neural network architecture (S1400) on a per UE basis, according to various embodiments.

Referring to FIG. 14 input parameters of the neural network are as follows:
1. Services Type
2. BLER requirements
3. Packet loss tolerance
4. UE category
5. Total system BW
6. System QCI load stats
7. Coherence time
8. Coherence BW Output parameters are as follows—
1. Target Carrier/Cell
2. MCS for required for each service
3. Number of BWPs in the systems
4. Number of active BWP for a UE
5. Service grouping based on QCI
6. BWP and QCI group mapping In the neural network predicted NN output values will be conveyed to the UE via RRC message. These messages will be conveyed to the corresponding UE periodically or dynamically.

The disclosed method can capture the logs from the UE and the user can analyse the data being exchanged. Based on the logs analysis, the user can tell whether competitor is using our approach or not. Further, the disclosed method checks whether the UE is reallocated to another carrier/Cell when Uplink Resource is unavailable.

According to example embodiments, a method for provisioning mobility management during congestion in a wireless network (1000). The method comprises detecting, by a network apparatus (200) in the wireless network (1000), a plurality of parameters of a current cell associated with at least one User Equipment (UE) (100) in the wireless network (1000), predicting, by the network apparatus (200), a UL congestion condition with an uplink radio resource of the current cell by applying at least one machine learning model on the plurality of parameters of the current cell, and performing, by the network apparatus (200), a mobility of the at least one UE (100) from the current cell to at least one target cell in the wireless network (1000) based on the predicted UL congestion condition with the uplink radio resource of the current cell associated with the at least one UE (100).

In one example embodiment, the detecting the plurality of parameters of the current cell associated with the at least one UE (100) in the wireless network (1000) comprises receiving, by the network apparatus (200), a Scheduling Request (SR) from the at least one UE (100) associated with the current cell for providing a UL Grant for uplink data transmission, detecting by the network apparatus (200), unavailability of uplink resources in response to the SR, and detecting, by a network apparatus (200), a plurality of parameters of the current cell in response to detecting unavailability of the uplink resources.

In one example embodiment, the performing the mobility of the at least one UE (100) from the current cell to at least one target cell in the wireless radio resource of the current cell associated with the at least one UE (100) comprises predicting, by the network apparatus (200), the at least one target cell in vicinity to the current cell and a plurality of parameters associated with the at least one predicted target cell by applying at least one machine learning on a plurality of characteristics of each cell in the wireless network (1000), wherein the at least one target cell has a less load of congestion than the predicted UL congestion condition of the current cell, selecting, by the network apparatus (200), the at least one predicted target cell, and performing, by the network apparatus (200), the mobility of the at least one UE (100) from the current cell to the at least one predicted target cell.

In one example embodiment, the plurality of characteristic of each cell in the wireless network (1000) comprises at least one of a UL congestion condition of each cell in the wireless network (1000), a UE traffic data type at each cell in the wireless network (1000), a UE priority type at of each cell in the wireless network (1000), a NACKS/ACK statistics of each cell in the wireless network (1000), throughput requirements of each cell in the wireless network (1000), a GBR and non-GBR queue lengths of each cell in the wireless network (1000), an interference statistics of each cell in the wireless network (1000), a CPU utilisation of each cell in the wireless network (1000), a physical resource block usage of each cell in the wireless network (1000), a user patterns of each cell in the wireless network (1000), a channel status of each cell in the wireless network (1000), a cell history on various call statistics of each cell in the wireless network (1000), and key performance indicators of each cell in the wireless network (1000), and wherein the key performance indicators comprises a mobility success related information of each cell in the wireless network (1000), a radio resource usage information of each cell in the wireless network (1000), or a cell capability information of each cell in the wireless network (1000).

In one example embodiment, the plurality of parameters associated with the at least one predicted target cell comprises at least one of a Modulation and Coding Scheme (MCS) for required for each service available at the at least one predicted target cell, a number of Bandwidth parts (BWPs) available at the at least one predicted target cell, a number of active BWP for the at least one UE (100) at the at least one predicted target cell, a service grouping based on QCI of the at least one predicted target cell, a BWP and QCI group mapping at the at least one predicted target cell.

In one example embodiment, the plurality of parameters associated with the current cell comprises at least one of a buffer status report received from the at least one UE (100) at the current cell, available uplink resources at the current cell, a service requirement of the at least one UE (100) associated with the current cell, a services type provided by the current cell to the at least one UE (100), Block Error Rate (BLER) requirements of the current cell, a packet loss tolerance of the current cell, a category of the at least one UE (100) associated with the current cell, a total system bandwidth (BW) of the current cell, a system QCI load statistics of the current cell, a coherence time of the current cell, and a coherence BW of the current cell, UE information associated with the current cell, a category and type of the at least one UE (100) associated with the current cell, a current date and time, an identifier of the network apparatus (200), a frequency of operation of the current cell, a location of the at least one UE (100) associated with the current cell, a density of the traffic at the current cell, a distribution of the traffic at the current cell, current climate conditions faced by the current cell, special occasions in location of the current cell, NACKS/ACK statistics, throughput requirements of the current cell, a GBR and non-GBR queue lengths of the current cell, an interference statistics of the current cell, a CPU utilisation of the current cell, a physical resource block usage of the current cell, a user patterns associated with the current cell, a channel status of the current cell, a cell history on various call statistics, and key performance indicators of the current cell, wherein the key performance indicators comprises a mobility success related information of the current cell, a radio resource usage information of the current cell, or a cell capability information of the current cell, and wherein the special occasions comprising festivals information in location of the current cell, functions information in location of the current cell, calendar based events information in location of the current cell, vacation information in location of the current cell, offer in location of the current cell.

In one example embodiment, the network apparatus (200) is one of a base station, a centralized server handling different base stations in the wireless network (1000), a Virtualized radio access networks (vRANs), Open Radio Access Network (O-RAN), a Cloud Radio Access Network (CRAN), a Distributive server handling different base stations in the wireless network (1000), and an Edge server handling different base stations in the wireless network (1000).

In one example embodiment, the method comprises creating and training the at least one machine learning model per UE or per network apparatus or per QoS Class Identifier (QCI) basis in the wireless network (1000) to detect the UL congestion based on the plurality of parameters, wherein the at least one machine learning model is hosted in at least one of a base station in the wireless network (1000), a Virtualized radio access networks (vRANs) in the wireless network (1000), Open Radio Access Network (O-RAN) in the wireless network (1000), and a Cloud Radio Access Network (CRAN) in the wireless network (1000).

According to example embodiments, a network apparatus (200) for provisioning mobility management during congestion in a wireless network (1000), wherein the network apparatus (200) comprises: a memory (230) comprising information of cells and UEs available in the wireless network (1000), a processor (210) connected to the memory (230), and a mobility management controller (240), communicatively connected to the memory (230) and the processor (210), configured to detect a plurality of parameters of a current cell associated with at least one User Equipment (UE) (100) in the wireless network (1000), predict a UL congestion condition with an uplink radio resource of the current cell by applying at least one machine learning model on the plurality of parameters of the current cell, and perform a mobility of the at least one UE (100) from the current cell to at least one target cell in the wireless network (1000) based on the predicted UL congestion condition with the uplink radio resource of the current cell associated with the at least one UE (100).

In one example embodiment, the detecting the plurality of parameters of the current cell associated with the at least one UE (100) in the wireless network (1000) comprises receive a Scheduling Request (SR) from the at least one UE (100) associated with the current cell for providing a UL grant for uplink data transmission, detect unavailability of uplink resources in response to the SR, and detect a plurality of parameters of the current cell in response to detecting unavailability of the uplink resources.

In one example embodiment, to perform the mobility of the at least one UE (100) from the current cell to at least one target cell in the wireless network (1000) based on the predicted UL congestion condition with the uplink radio resource of the current cell associated with the at least one UE (100), the processor is configured to predict the at least one target cell in vicinity to the current cell and a plurality of parameters associated with the at least one predicted target cell by applying at least one machine learning on a plurality of characteristics of each cell in the wireless network (1000), wherein the at least one target cell has a less load of congestion than the predicted UL congestion condition of the current cell, select the at least one predicted target cell, and perform the mobility of the at least one UE (100) from the current cell to the at least one predicted target cell.

In one example embodiment, the plurality of characteristic of each cell in the wireless network (1000) comprises at least one of a UL congestion condition of each cell in the wireless network (1000), a UE traffic data type at each cell in the wireless network (1000), a UE priority type at of each cell in the wireless network (1000), a NACKS/ACK statistics of each cell in the wireless network (1000), throughput requirements of each cell in the wireless network (1000), a GBR and non-GBR queue lengths of each cell in the wireless network (1000), an interference statistics of each cell in the wireless network (1000), a CPU utilisation of each cell in the wireless network (1000), a physical resource block usage of each cell in the wireless network (1000), a user patterns of each cell in the wireless network (1000), a channel status of each cell in the wireless network (1000), a cell history on various call statistics of each cell in the wireless network (1000), and key performance indicators of each cell in the wireless network (1000), and wherein the key performance indicators comprises a mobility success related information of each cell in the wireless network (1000), a radio resource usage information of each cell in the wireless network (1000), or a cell capability information of each cell in the wireless network (1000).

In one example embodiment, the plurality of parameters associated with the at least one predicted target cell comprises at least one of a Modulation and Coding Scheme (MCS) for required for each service available at the at least one predicted target cell, a number of Bandwidth parts (BWPs) available at the at least one predicted target cell, a number of active BWP for the at least one UE (100) at the at least one predicted target cell, a service grouping based on QCI of the at least one predicted target cell, a BWP and QCI group mapping at the at least one predicted target cell.

In one example embodiment, the plurality of parameters associated with the current cell comprises at least one of a buffer status report received from the at least one UE (100) at the current cell, available uplink resources at the current cell, a service requirement of the at least one UE (100) associated with the current cell, a services type provided by the current cell to the at least one UE (100), Block Error Rate (BLER) requirements of the current cell, a packet loss tolerance of the current cell, a category of the at least one UE (100) associated with the current cell, a total system bandwidth (BW) of the current cell, a system QCI load statistics of the current cell, a coherence time of the current cell, and a coherence BW of the current cell, UE information associated with the current cell, a category and type of the at least one UE (100) associated with the current cell, a current date and time, an identifier of the network apparatus (200), a frequency of operation of the current cell, a location of the at least one UE (100) associated with the current cell, a density of the traffic at the current cell, a distribution of the traffic at the current cell, current climate conditions faced by the current cell, special occasions in location of the current cell, NACKS/ACK statistics, throughput requirements of the current cell, a GBR and non-GBR queue lengths of the current cell, an interference statistics of the current cell, a CPU utilisation of the current cell, a physical resource block usage of the current cell, a user patterns associated with the current cell, a channel status of the current cell, a cell history on various call statistics, and key performance indicators of the current cell, wherein the key performance indicators comprises a mobility success related information of the current cell, a radio resource usage information of the current cell, or a cell capability information of the current cell, and wherein the special occasions comprising festivals information in location of the current cell, functions information in location of the current cell, calendar based events information in location of the current cell, vacation information in location of the current cell, offer in location of the current cell.

In one example embodiment, the network apparatus (200) is one of a base station, a centralized server handling different base stations in the wireless network (1000), a Virtualized radio access networks (vRANs), Open Radio Access Network (O-RAN), a Cloud Radio Access Network (CRAN), a Distributive server handling different base stations in the wireless network (1000), and an Edge server handling different base stations in the wireless network (1000).

In one example embodiment, the mobility management controller (240) is configured to create and train the at least one machine learning model per UE or per network apparatus or per QoS Class Identifier (QCI) basis in the wireless network (1000) to detect the UL Congestion based on the plurality of parameters, wherein the at least one machine learning model is hosted in at least one of a base station in the wireless network (1000), a Virtualized radio access networks (vRANs) in the wireless network (1000), Open Radio Access Network (O-RAN) in the wireless network (1000), and a Cloud Radio Access Network (CRAN) in the wireless network (1000).

According to example embodiments, A method for provisioning mobility management during congestion in a wireless network (1000). The method comprises detecting, by a network apparatus (200) in the wireless network (1000), a plurality of parameters of a current cell associated with at least one User Equipment (UE) (100) in the wireless network (1000), predicting, by the network apparatus (200), a UL congestion condition with an uplink radio resource of the current cell, and performing, by the network apparatus (200), a mobility of the at least one UE (100) from the current cell to at least one target cell in the wireless radio resource of the current cell associated with the at least one UE (100).

According to example embodiments, a network apparatus (200) for provisioning mobility management during congestion in a wireless network (1000). The network apparatus (200) comprises a memory (230) comprising information of cells and UEs available in the wireless network (1000), a processor (210) connected to the memory (230), and a mobility management controller (240), communicatively connected to the memory (230). The processor (210), configured to detect a plurality of parameters of a current cell associated with at least one User Equipment (UE) (100) in the wireless network (1000), predict a UL congestion condition with an uplink radio resource of the current cell, and perform a mobility of the at least one UE (100) from the current cell to at least one target cell in the wireless network (1000) based on the predicted UL congestion condition with the uplink radio resource of the current cell associated with the at least one UE (100).

According to example embodiments, a method performed by a network apparatus in a wireless network, comprises detecting, by the network apparatus, a plurality of parameters of a current cell associated with at least one user equipment (UE) in the wireless network, predicting, by the network apparatus, an uplink (UL) congestion condition with an uplink radio resource of the current cell by applying at least one machine learning model to the plurality of parameters of the current cell, and performing, by the network apparatus, a mobility of the at least one UE from the current cell to at least one target cell in the wireless network based on the predicted UL congestion condition with the uplink radio resource of the current cell associated with the at least one UE.

In one example embodiment, detecting the plurality of parameters of the current cell associated with the at least one UE in the wireless network comprises: receiving, by the network apparatus, a scheduling request (SR) from the at least one UE associated with the current cell for providing a UL Grant for uplink data transmission, detecting by the network apparatus, unavailability of uplink resources in response to the SR, and detecting, by a network apparatus, a plurality of parameters of the current cell in response to detecting unavailability of the uplink resources.

In one example embodiment, performing the mobility of the at least one UE from the current cell to at least one target cell in the wireless network based on the predicted UL congestion condition with the uplink radio resource of the current cell associated with the at least one UE comprises: predicting, by the network apparatus, the at least one target cell in a vicinity to the current cell and a plurality of parameters associated with the at least one predicted target cell by applying at least one machine learning to a plurality of characteristics of each cell in the wireless network, wherein the at least one target cell has a lower load of congestion than the predicted UL congestion condition of the current cell, selecting, by the network apparatus, the at least one predicted target cell, and performing, by the network apparatus, the mobility of the at least one UE from the current cell to the at least one predicted target cell.

In one example embodiment, the plurality of characteristics of each cell in the wireless network comprises at least one of a UL congestion condition of each cell in the wireless network, a UE traffic data type at each cell in the wireless network, a UE priority type at of each cell in the wireless network, a non-acknowledges/acknowledge (NACK/ACK) statistics of each cell in the wireless network, throughput requirements of each cell in the wireless network, a guaranteed bit rate (GBR) and non-GBR queue lengths of each cell in the wireless network, interference statistics of each cell in the wireless network, a central processing unit (CPU) utilisation of each cell in the wireless network, a physical resource block usage of each cell in the wireless network, user patterns of each cell in the wireless network, a channel status of each cell in the wireless network, a cell history of various call statistics of each cell in the wireless network, and key performance indicators of each cell in the wireless network, wherein the key performance indicators comprise: a mobility success related information of each cell in the wireless network, a radio resource usage information of each cell in the wireless network, or a cell capability information of each cell in the wireless network.

In one example embodiment, the plurality of parameters associated with the at least one predicted target cell comprises at least one of a modulation and coding scheme (MCS) for required for each service available at the at least one predicted target cell, a number of bandwidth parts (BWPs) available at the at least one predicted target cell, a number of active BWP for the at least one UE at the at least one predicted target cell, a service grouping based on quality of service (QoS) class identifier (QCI) of the at least one predicted target cell, a BWP and QCI group mapping at the at least one predicted target cell.

In one example embodiment, wherein the plurality of parameters associated with the current cell comprises at least one of a buffer status report received from the at least one UE at a current cell, available uplink resources at the current cell, a service requirement of the at least one UE associated with the current cell, a services type provided by the current cell to the at least one UE, block error rate (BLER) requirements of the current cell, a packet loss tolerance of the current cell, a category of the at least one UE associated with the current cell, a total system bandwidth (BW) of the current cell, a system quality of service (QoS) class identifier (QCI) load statistics of the current cell, a coherence time of the current cell, and a coherence BW of the current cell, UE information associated with the current cell, a category and type of the at least one UE associated with the current cell, a current date and time, an identifier of the network apparatus, a frequency of operation of the current cell, a location of the at least one UE associated with the current cell, a density of the traffic at the current cell, a distribution of the traffic at the current cell, current climate conditions faced by the current cell, special occasions in location of the current cell, NACKS/ACK statistics, throughput requirements of the current cell, a GBR and non-GBR queue lengths of the current cell, an interference statistics of the current cell, a central processing unit (CPU) utilisation of the current cell, a physical resource block usage of the current cell, user patterns associated with the current cell, a channel status of the current cell, a cell history on various call statistics, and key performance indicators of the current cell, wherein the key performance indicators comprise: mobility success related information of the current cell, radio resource usage information of the current cell, and cell capability information of the current cell, and wherein special occasions comprising festivals information in location of the current cell, functions information in location of the current cell, calendar based events information in location of the current cell, vacation information in location of the current cell, offer in location of the current cell.

In one example embodiment, the network apparatus includes one of a base station, a centralized server handling different base stations in the wireless network, a virtualized radio access networks (vRANs), open radio access network (O-RAN), a cloud radio access network (CRAN), a distributive server handling different base stations in the wireless network, and an edge server handling different base stations in the wireless network.

In one example embodiment, the method further comprises creating and training the at least one machine learning model per UE or per network apparatus or per quality of service (QoS) class identifier (QCI) basis in the wireless network to detect UL congestion based on the plurality of parameters. The at least one machine learning model is hosted in at least one of a base station in the wireless network, virtualized radio access networks (vRANs) in the wireless network, open radio access network (O-RAN) in the wireless network, and a cloud radio access network (CRAN) in the wireless network.

According to example embodiments, A network apparatus configured to provide mobility management during congestion in a wireless network, wherein the network apparatus comprises a memory comprising information of cells and user equipments (UEs) available in the wireless network, at least one processor connected to the memory, and a mobility management controller, communicatively connected to the memory and the at least one processor. The mobility management controller is configured to: detect a plurality of parameters of a current cell associated with at least one UE in the wireless network, predict an uplink (UL) congestion condition with an uplink radio resource of the current cell by applying at least one machine learning model to the plurality of parameters of the current cell, and perform a mobility of the at least one UE from the current cell to at least one target cell in the wireless network based on the predicted UL congestion condition with the uplink radio resource of the current cell associated with the at least one UE.

In one example embodiment, to detect the plurality of parameters of the current cell associated with the at least one UE in the wireless network, the mobility management controller is configured to receive a scheduling request (SR) from the at least one UE associated with the current cell for providing a UL grant for uplink data transmission, detect unavailability of uplink resources in response to the SR, and detect a plurality of parameters of the current cell in response to detecting unavailability of the uplink resources.

In one example embodiment, to determine the mobility of the at least one UE from the current cell to at least one target cell in the wireless network based on the predicted UL congestion condition with the uplink radio resource of the current cell associated with the at least one UE, the mobility management controller is configured to: predict the at least one target cell in vicinity of the current cell and a plurality of parameters associated with the at least one predicted target cell by applying at least one machine learning on a plurality of characteristics of each cell in the wireless network. The at least one target cell has a lower load of congestion than the predicted UL congestion condition of the current cell, select the at least one predicted target cell, and detect the mobility of the at least one UE from the current cell to the at least one predicted target cell.

In one example embodiment, the plurality of characteristics of each cell in the wireless network comprises at least one of: a UL congestion condition of each cell in the wireless network, a UE traffic data type at each cell in the wireless network, a UE priority type at of each cell in the wireless network, a non-acknowledges/acknowledge (NACKS/ACK) statistics of each cell in the wireless network, throughput requirements of each cell in the wireless network, guaranteed bit rate (GBR) and non-GBR queue lengths of each cell in the wireless network, interference statistics of each cell in the wireless network, a central processing unit (CPU) utilisation of each cell in the wireless network, a physical resource block usage of each cell in the wireless network, user patterns of each cell in the wireless network, a channel status of each cell in the wireless network, a cell history of various call statistics of each cell in the wireless network, and key performance indicators of each cell in the wireless network, wherein the key performance indicators comprise a mobility success related information of each cell in the wireless network, radio resource usage information of each cell in the wireless network, and cell capability information of each cell in the wireless network.

In one example embodiment, the plurality of parameters associated with the at least one predicted target cell comprises at least one of a modulation and coding scheme (MCS) for required for each service available at the at least one predicted target cell, a number of bandwidth parts (BWPs) available at the at least one predicted target cell, a number of active BWP for the at least one UE at the at least one predicted target cell, a service grouping based on quality of service (QoS) class identifier (QCI) of the at least one predicted target cell, a BWP and QCI group mapping at the at least one predicted target cell.

In one example embodiment, the plurality of parameters associated with the current cell comprises at least one of a buffer status report received from the at least one UE at the current cell, available uplink resources at the current cell, a service requirement of the at least one UE associated with the current cell, a services type provided by the current cell to the at least one UE, block error rate (BLER) requirements of the current cell, a packet loss tolerance of the current cell, a category of the at least one UE associated with the current cell, a total system bandwidth (BW) of the current cell, a system quality of service (QoS) class identifier (QCI) load statistics of the current cell, a coherence time of the current cell, and a coherence BW of the current cell, UE information associated with the current cell, a category and type of the at least one UE associated with the current cell, a current date and time, an identifier of the network apparatus, a frequency of operation of the current cell, a location of the at least one UE associated with the current cell, a density of the traffic at the current cell, a distribution of the traffic at the current cell, current climate conditions faced by the current cell, special occasions in location of the current cell, non-acknowledges/acknowledge (NACKS/ACK) statistics, throughput requirements of the current cell, a guaranteed bit rate (GBR) and non-GBR queue lengths of the current cell, interference statistics of the current cell, a central processing unit (CPU) utilisation of the current cell, a physical resource block usage of the current cell, a user patterns associated with the current cell, a channel status of the current cell, a cell history on various call statistics, and key performance indicators of the current cell, wherein the key performance indicators comprise mobility success related information of the current cell, a radio resource usage information of the current cell, and cell capability information of the current cell, and wherein the special occasions comprising festivals information in location of the current cell, functions information in location of the current cell, calendar based events information in location of the current cell, vacation information in location of the current cell, offer in location of the current cell.

In one example embodiment, the network apparatus is one of a base station, a centralized server handling different base stations in the wireless network, a virtualized radio access networks (vRANs), Open radio access network (O-RAN), a cloud radio access network (CRAN), a distributive server handling different base stations in the wireless network, and an edge server handling different base stations in the wireless network.

In one example embodiment, the mobility management controller is further configured to: create and train the at least one machine learning model per UE or per network apparatus or per quality of service (QoS) class identifier (QCI) basis in the wireless network, detect the UL Congestion based on the plurality of parameters, wherein the at least one machine learning model is hosted in at least one of a base station in the wireless network, a virtualized radio access networks (vRANs) in the wireless network, open radio access network (O-RAN) in the wireless network, and a cloud radio access network (CRAN) in the wireless network.

According to example embodiments, a network apparatus configured to provision mobility management during congestion in a wireless network, wherein the network apparatus comprises: a memory comprising information of cells and user equipments (UEs) available in the wireless network, at least one processor connected to the memory, and a mobility management controller, communicatively connected to the memory and the at least one processor, configured to detect a plurality of parameters of a current cell associated with at least one UE in the wireless network, predict an uplink (UL) congestion condition with an uplink radio resource of the current cell, and perform a mobility of the at least one UE from the current cell to at least one target cell in the wireless network based on the predicted UL congestion condition with the uplink radio resource of the current cell associated with the at least one UE.

In one example embodiment, to detect the plurality of parameters of the current cell associated with the at least one UE in the wireless network, the mobility management controller is configured to receive a scheduling request (SR) from the at least one UE associated with the current cell for providing a UL grant for uplink data transmission, detect unavailability of uplink resources in response to the SR, and detect a plurality of parameters of the current cell in response to detecting unavailability of the uplink resources.

In one example embodiment, the plurality of parameters associated with the at least one predicted target cell comprises at least one of a modulation and coding scheme (MCS) for required for each service available at the at least one predicted target cell, a number of bandwidth parts (BWPs) available at the at least one predicted target cell, a number of active BWP for the at least one UE at the at least one predicted target cell, a service grouping based on quality of service (QoS) class identifier (QCI) of the at least one predicted target cell, a BWP and QCI group mapping at the at least one predicted target cell.

In one example embodiment, the plurality of parameters associated with the current cell comprises at least one of a buffer status report received from the at least one UE at the current cell, available uplink resources at the current cell, a service requirement of the at least one UE associated with the current cell, a services type provided by the current cell to the at least one UE, block error rate (BLER) requirements of the current cell, a packet loss tolerance of the current cell, a category of the at least one UE associated with the current cell, a total system bandwidth (BW) of the current cell, a system quality of service (QoS) class identifier (QCI) load statistics of the current cell, a coherence time of the current cell, and a coherence BW of the current cell, UE information associated with the current cell, a category and type of the at least one UE associated with the current cell, a current date and time, an identifier of the network apparatus, a frequency of operation of the current cell, a location of the at least one UE associated with the current cell, a density of the traffic at the current cell, a distribution of the traffic at the current cell, current climate conditions faced by the current cell, special occasions in location of the current cell, non-acknowledges/acknowledge (NACKS/ACK) statistics, throughput requirements of the current cell, a guaranteed bit rate (GBR) and non-GBR queue lengths of the current cell, interference statistics of the current cell, a central processing unit (CPU) utilisation of the current cell, a physical resource block usage of the current cell, a user patterns associated with the current cell, a channel status of the current cell, a cell history on various call statistics, and key performance indicators of the current cell, wherein the key performance indicators comprise mobility success related information of the current cell, a radio resource usage information of the current cell, and cell capability information of the current cell, and wherein the special occasions comprising festivals information in location of the current cell, functions information in location of the current cell, calendar based events information in location of the current cell, vacation information in location of the current cell, offer in location of the current cell.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a network apparatus in a wireless network, comprising:
   receiving a scheduling request (SR) from a user equipment (UE) associated with a current cell for providing an uplink (UL) grant for uplink data transmission;
   determining whether uplink resources for the uplink data transmission are available or not at the current cell in response to the SR;
   in accordance with a determination that the uplink resources for the uplink data transmission are available at the current cell, transmitting an UL grant for allocating the uplink resources to the UE associated with the current cell,
   in accordance with a determination that the uplink resources for the uplink data transmission are unavailable at the current cell:
      predicting a UL congestion condition of the current cell by applying at least one machine learning to a plurality of parameters of the current cell including a service type provided by the current cell to the UE and a packet loss tolerance of the current cell;
      identifying a target cell by applying at least one machine learning to a plurality of characteristics of each cell in the wireless network, wherein a predicted load of the target cell is lower than a predicted load of the current cell in accordance with the predicted UL congestion condition of the current cell; and
      performing a handover of the UE from the current cell to the target cell in the wireless network,
   wherein the plurality of characteristics of each cell in the wireless network includes handover success related information of a corresponding cell in the wireless network, a UL congestion condition of the corresponding cell in the wireless network, and a UE traffic data type at the corresponding cell in the wireless network.

2. The method of claim 1, wherein the plurality of characteristics of each cell in the wireless network further includes a UE priority type at of the corresponding cell in the wireless network, a non-acknowledges/acknowledge (NACK/ACK) statistics of the corresponding cell in the wireless network, throughput requirements of the corresponding cell in the wireless network, a guaranteed bit rate (GBR) and non-GBR queue lengths of the corresponding cell in the wireless network, interference statistics of the corresponding cell in the wireless network, a central processing unit (CPU) utilisation of the corresponding cell in the wireless network, a physical resource block usage of the corresponding cell in the wireless network, user patterns of the corresponding cell in the wireless network, a channel status of the corresponding cell in the wireless network, a cell history of various call statistics of the corresponding cell in the wireless network, radio resource usage information of the corresponding cell in the wireless network, and a cell capability information of the corresponding cell in the wireless network.

3. The method of claim 2, further comprising:
   predicting a plurality of parameters associated with the target cell based on the plurality of characteristics of each cell in the wireless network,
   wherein the plurality of parameters associated with the target cell comprises a modulation and coding scheme (MCS) for required for each service available at the target cell, a number of bandwidth parts (BWPs) available at the target cell, a number of active BWP for the UE at the target cell, a service grouping based on quality of service (QoS) class identifier (QCI) of the target cell, and a BWP and QCI group mapping at the target cell.

4. The method of claim 1,
   wherein the plurality of parameters associated with the current cell further includes a buffer status report received from the UE at a current cell, available uplink resources at the current cell, a service requirement of the UE associated with the current cell, block error rate (BLER) requirements of the current cell, a category of the UE associated with the current cell, a total system bandwidth (BW) of the current cell, a system quality of service (QoS) class identifier (QCI) load statistics of the current cell, a coherence time of the current cell, and a coherence BW of the current cell, UE information associated with the current cell, a category and type of the UE associated with the current cell, a current date and time, an identifier of the network apparatus, a frequency of operation of the current cell, a location of the UE associated with the current cell, a density of the traffic at the current cell, a distribution of the traffic at the current cell, current climate conditions faced by the current cell, special occasions in location of the current cell, non-acknowledges/acknowledge (NACK/ACK)

statistics, throughput requirements of the current cell, a guaranteed bit rate (GBR) and non-GBR queue lengths of the current cell, an interference statistics of the current cell, a central processing unit (CPU) utilisation of the current cell, a physical resource block usage of the current cell, user patterns associated with the current cell, a channel status of the current cell, a cell history on various call statistics, radio resource usage information of the current cell, ander cell capability information of the current cell, and wherein the special occasions are related to calendar based events information in location of the current cell.

5. The method of claim 1, wherein the network apparatus includes one of a base station, a centralized server handling different base stations in the wireless network, a virtualized radio access networks (vRANs), open radio access network (O-RAN), a cloud radio access network (CRAN), a distributive server handling different base stations in the wireless network, and an edge server handling different base stations in the wireless network.

6. The method of claim 1, further comprising:
creating and training at least one machine learning per quality of service (QoS) class identifier (QCI) basis in the wireless network to detect UL congestion based on the plurality of parameters,
wherein the at least one machine learning is hosted in at least one of a base station in the wireless network, virtualized radio access networks (vRANs) in the wireless network, open radio access network (O-RAN) in the wireless network, and a cloud radio access network (CRAN) in the wireless network.

7. A network apparatus configured to provide mobility management during congestion in a wireless network, wherein the network apparatus comprises:
at least one processor; and
memory storing instructions that, when executed by the at least one processor, cause the network apparatus to:
obtain a scheduling request (SR) from a user equipment (UE) associated with a current cell for providing an uplink (UL) grant for uplink data transmission;
determine whether uplink resources for the uplink data transmission are available or not at the current cell in response to the SR;
in accordance with a determination that the uplink resources for the uplink data transmission are available at the current cell, transmit an UL grant for allocating the uplink resources to the UE associated with the current cell,
in accordance with a determination that the uplink resources for the uplink data transmission are unavailable at the current cell:
predict a UL congestion condition of the current cell by applying at least one machine learning to a plurality of parameters of the current cell including a service type provided by the current cell to the UE and a packet loss tolerance of the current cell;
identify a target cell by applying at least one machine learning to a plurality of characteristics of each cell in the wireless network, wherein a predicted load of the target cell is lower than a predicted load of the current cell in accordance with the predicted UL congestion condition of the current cell; and
perform a handover of the UE from the current cell to the target cell in the wireless network,
wherein the plurality of characteristics of each cell in the wireless network includes handover success related information of a corresponding cell in the wireless network, a UL congestion condition of the corresponding cell in the wireless network, and a UE traffic data type at the corresponding cell in the wireless network.

8. The network apparatus of claim 7, wherein the plurality of characteristics of each cell in the wireless network further includes a UE priority type at of the corresponding cell in the wireless network, a non-acknowledges/acknowledge (NACK/ACK) statistics of the corresponding cell in the wireless network, throughput requirements of the corresponding cell in the wireless network, guaranteed bit rate (GBR) and non-GBR queue lengths of the corresponding cell in the wireless network, interference statistics of the corresponding cell in the wireless network, a central processing unit (CPU) utilisation of the corresponding cell in the wireless network, a physical resource block usage of the corresponding cell in the wireless network, user patterns of the corresponding cell in the wireless network, a channel status of the corresponding cell in the wireless network, a cell history of various call statistics of the corresponding cell in the wireless network, radio resource usage information of the corresponding cell in the wireless network, and cell capability information of the corresponding cell in the wireless network.

9. The network apparatus of claim 8,
wherein the instructions, when executed by the at least one processor, cause the network apparatus to predict a plurality of parameters associated with the target cell based on the plurality of characteristics of each cell in the wireless network,
wherein the plurality of parameters associated with the target cell comprises at least one of a modulation and coding scheme (MCS) for required for each service available at the target cell, a number of bandwidth parts (BWPs) available at the target cell, a number of active BWP for the UE at the target cell, a service grouping based on quality of service (QoS) class identifier (QCI) of the target cell, and a BWP and QCI group mapping at the target cell.

10. The network apparatus of claim 7,
wherein the plurality of parameters associated with the current cell further includes a buffer status report received from the UE at the current cell, available uplink resources at the current cell, a service requirement of the UE associated with the current cell, block error rate (BLER) requirements of the current cell, a category of the UE associated with the current cell, a total system bandwidth (BW) of the current cell, a system quality of service (QoS) class identifier (QCI) load statistics of the current cell, a coherence time of the current cell, and a coherence BW of the current cell, UE information associated with the current cell, a category and type of the UE associated with the current cell, a current date and time, an identifier of the network apparatus, a frequency of operation of the current cell, a location of the UE associated with the current cell, a density of the traffic at the current cell, a distribution of the traffic at the current cell, current climate conditions faced by the current cell, special occasions in location of the current cell, non-acknowledges/acknowledge (NACK/ACK) statistics, throughput requirements of the current cell, a guaranteed bit rate (GBR) and non-GBR queue lengths of the current cell, an interference statistics of the current cell, a central processing unit (CPU) utilisation of the current cell, a physical resource block usage of the current cell, user patterns associated with the current cell, a channel status of the current cell, a cell history on various call statistics, radio resource usage information of the current cell, and cell capability information of the current cell, and wherein the special occasions are related to calendar based events information in location of the current cell.

11. The network apparatus of claim 7, wherein the network apparatus is one of a base station, a centralized server handling different base stations in the wireless network, a virtualized radio access networks (vRANs), Open radio access network (O-RAN), a cloud radio access network (CRAN), a distributive server handling different base stations in the wireless network, and an edge server handling different base stations in the wireless network.

12. The network apparatus of claim 7,
wherein the instructions, when executed by the at least one processor, cause the network apparatus to:
create and train at least one machine learning per quality of service (QoS) class identifier (QCI) basis in the wireless network to detect the UL Congestion based on the plurality of parameters, and
wherein the at least one machine learning is hosted in at least one of a base station in the wireless network, virtualized radio access networks (vRANs) in the wireless network, open radio access network (O-RAN) in the wireless network, and a cloud radio access network (CRAN) in the wireless network.

* * * * *